(12) United States Patent
Määttanen et al.

(10) Patent No.: US 10,924,919 B2
(45) Date of Patent: Feb. 16, 2021

(54) TRANSPARENT PER-BEARER SWITCHING BETWEEN WWAN AND WLAN

(71) Applicant: Telefonaktiebolaget LM Ericsson (publ), Stockholm (SE)

(72) Inventors: Helka-Liina Määttanen, Helsinki (FI); Mattias Bergström, Stockholm (SE); Torsten Dudda, Aachen (DE); Gino Masini, Stockholm (SE); Filip Mestanov, Brottby (SE); Stefan Rommer, Västra Frölunda (SE); Jari Vikberg, Järna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 155 days.

(21) Appl. No.: 15/760,948

(22) PCT Filed: Oct. 7, 2016

(86) PCT No.: PCT/SE2016/050972
§ 371 (c)(1),
(2) Date: Mar. 16, 2018

(87) PCT Pub. No.: WO2017/061948
PCT Pub. Date: Apr. 13, 2017

(65) Prior Publication Data
US 2018/0262465 A1 Sep. 13, 2018

Related U.S. Application Data

(60) Provisional application No. 62/239,082, filed on Oct. 8, 2015.

(51) Int. Cl.
*H04W 12/00* (2009.01)
*H04W 76/12* (2018.01)
(Continued)

(52) U.S. Cl.
CPC ....... *H04W 12/001* (2019.01); *H04L 63/0209* (2013.01); *H04L 63/029* (2013.01);
(Continued)

(58) Field of Classification Search
CPC ... H04L 63/029; H04L 63/0209; H04L 63/08; H04L 12/66; H04L 29/06551;
(Continued)

(56) References Cited

U.S. PATENT DOCUMENTS

2007/0076665 A1* 4/2007 Nair ............... H04W 48/18
370/335
2009/0190550 A1* 7/2009 Giustina ............ H04L 63/0471
370/331

(Continued)

OTHER PUBLICATIONS

Intel Corporation, "Revised WID: LTE-WLAN Radio Level Integration and Interworking Enhancement", 3GPP TSG RAN Meeting #68, Jun. 15-18, 2018, pp. 1-10, Malmo, Sweden, RP-151114.
(Continued)

*Primary Examiner* — Warner Wong
(74) *Attorney, Agent, or Firm* — Patent Portfolio Builders, PLLC

(57) ABSTRACT

A wireless communication device (12) served by a wireless wide area network (WWAN) base station supports per-bearer switching of bearer traffic between the WWAN and a wireless local area network (WLAN) in a manner transparent to the WLAN. The device in this regard establishes a secure tunnel (24) through the WLAN to a security gateway (22), based on the device receiving a message from the WWAN base station (18) to establish the secure tunnel (24). The device switches bearer traffic between the WWAN and the WLAN on a per bearer basis, with bearer traffic switched to the WLAN being transported through the secure tunnel
(Continued)

(24) and over a connection (26) between the security gateway (22) and the WWAN base station (18).

20 Claims, 16 Drawing Sheets

(51) Int. Cl.
    *H04W 12/06*     (2021.01)
    *H04W 12/08*     (2021.01)
    *H04L 29/06*     (2006.01)
    *H04W 84/12*     (2009.01)
    *H04W 88/06*     (2009.01)

(52) U.S. Cl.
    CPC ... *H04W 12/0013* (2019.01); *H04W 12/0608* (2019.01); *H04W 12/0609* (2019.01); *H04W 12/0808* (2019.01); *H04W 76/12* (2018.02); *H04L 29/06551* (2013.01); *H04L 63/0272* (2013.01); *H04L 63/164* (2013.01); *H04W 84/12* (2013.01); *H04W 88/06* (2013.01)

(58) Field of Classification Search
    CPC .. H04L 65/102; H04L 65/1023; H04W 84/12; H04W 12/06; H04W 76/12; H04W 12/00; H04W 12/08; H04W 28/0252; H04W 28/0257; H04W 28/0263; H04W 28/085; H04W 36/28; H04W 76/00; H04W 76/20; H04W 76/22

See application file for complete search history.

(56) References Cited

U.S. PATENT DOCUMENTS

| | | | | |
|---|---|---|---|---|
| 2010/0002667 A1* | 1/2010 | Lin | ........................ | H04W 88/06 370/338 |
| 2011/0230193 A1* | 9/2011 | Vikberg | ............ | H04W 36/0022 455/436 |
| 2015/0250009 A1* | 9/2015 | Kahn | .................. | H04W 76/026 370/329 |
| 2015/0282029 A1* | 10/2015 | Faccin | .............. | H04W 36/0022 370/331 |
| 2015/0327129 A1* | 11/2015 | Faccin | .............. | H04W 36/0055 370/331 |
| 2015/0350989 A1* | 12/2015 | Himayat | ........... | H04W 36/0066 370/331 |
| 2015/0351138 A1* | 12/2015 | Metsala | ................ | H04W 76/10 370/254 |
| 2016/0057669 A1* | 2/2016 | Hong | ................ | H04W 36/0077 370/331 |
| 2016/0198364 A1* | 7/2016 | Schwarzbauer | ...... | H04W 28/08 370/331 |
| 2016/0227454 A1* | 8/2016 | Toskala | ............ | H04W 36/0033 |
| 2016/0295473 A1* | 10/2016 | Lee | ..................... | H04W 36/023 |
| 2018/0206282 A1* | 7/2018 | Singh | .................... | H04W 88/06 |
| 2019/0260608 A1* | 8/2019 | Baboescu | ........... | H04L 12/4633 |

OTHER PUBLICATIONS

Intel Corporation et al., "New WI Proposal: LTE-WLAN Radio Level Integration and Interworking Enhancement", 3GPP TSG RAN Meeting #67, Mar. 9-12, 2015, pp. 1-9, Shanghai, China, RP-150510.

Ericsson, "Stage two for LWIP", 3GPP TSG-RAN WG2 #93, Feb. 15-19, 2016, pp. 1-8, Malta, Tdoc R2-161593.

Ericsson, "Overview of LTE-WLAN integration supporting legacy WLAN", 3GPP TSG-RAN WG2 #91 bis, Oct. 5-8, 2015, pp. 1-6, Malmo, Sweden, Tdoc R2-154769.

3rd Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", 3GPP TS 36.300 V13.4.0, Jun. 2016, pp. 1-310.

3rd Generation Partnership Project, "Technical Specification Group Services and System Aspects; General Packet Radio Service (GPRS) enhancements for Evolved Universal Terrestrial Radio Access Network (E-UTRAN) access (Release 13)", 3GPP TS 23.401 V13.4.0, Sep. 2015, pp. 1-334.

3rd Generation Partnership Project, "Technical Specification Group Services and System Aspects; Architecture enhancements for non-3GPP accesses (Release 13)", 3GPP TS 23.402 V13.3.0, Sep. 2015, pp. 1-298.

3rd Generation Partnership Project, "Technical Specification Group Services and System Aspects; 3GPP System Architecture Evolution (SAE); Security architecture (Release 14)", 3GPP TS 33.401 V14.0.0, Sep. 2016, pp. 1-152.

Office Action issued in corresponding EP Application No. 16788264.6 dated Apr. 8, 2020, 03 Pages.

* cited by examiner

TRANSPARENT PER-BEARER SWITCHING BETWEEN WWAN AND WLAN

RELATED APPLICATIONS

This application claims priority to U.S. Provisional patent Application Ser. No. 62/239,082 filed Oct. 8, 2015, the entire contents of which are incorporated herein by reference.

BACKGROUND

Recently, RAN2 has started a new work item, focusing on enabling access aggregation between the $3^{rd}$ generation partnership project (3GPP) and legacy wireless local area network (WLAN). Legacy WLAN implies that the WLAN network used for the access aggregation should not be a subject to any standard changes (as opposed to the previously studies scenario, where the WLAN network would need to support additional functionality). This legacy WLAN aggregation scenario is interesting mostly to Operators that have large deployed WLAN base, on which they would like to leverage.

A new work item (WI) describes a solution for integration of Long Term Evolution (LTE) and WLAN (i.e., LTE-WLAN integration), which allows reuse of legacy WLAN deployments without need for modification. This is achieved by establishing an Internet Protocol Security (IPSec) tunnel between a user equipment (UE) and an enhanced Node B (eNB) over WLAN. The eNB would then switch on a per bearer level traffic between LTE and the IPSec tunnel to be transmitted to the UE.

With the new WI, a scenario is addressed where WLAN integration directly into LTE RAN above the packet data convergence protocol (PDCP) is seen beneficial. This is for example envisioned to be the case of a shopping mall where an LTE eNB is deployed and connected to several WLAN nodes. The eNB controls offloading bearers to the WLAN nodes. Incoming traffic arrives in the eNB and is forwarded from there to the WLAN nodes.

It is an objective of this WI to reuse a concept done for the LTE-WLAN Aggregation (LWA) work item. There seems to be consensus to reuse at least the measurements and the concept of a mobility set. As UE WLAN mobility events may cause IPSec re-establishment, the UE mobility should be limited in order to have a controllable amount of IPSec re-establishments at the eNB.

Challenges thereby exist in this and other contexts for performing per-bearer switching between a wireless wide area network (WWAN) such as a 3GPP network and a WLAN.

SUMMARY

One or more embodiments herein relate to per-bearer switching of bearer traffic between a wireless wide area network (e.g., LTE network) and a wireless local area network (e.g., WiFi) in a manner that is transparent to the WLAN. One or more of these embodiments in this regard advantageously interpose a security gateway between a wireless communication device (e.g., LTE/WiFi UE) and a WWAN base station (e.g., eNodeB). In at least some embodiments, for example, this proves advantageous for isolating the WWAN base station so as not to expose it to malicious attack, for allowing more flexible deployment options, and/or for improving routing efficiency.

More particularly, embodiments herein include a method implemented by a security gateway for supporting per-bearer switching of bearer traffic between a wireless wide area network (WWAN) and a wireless local area network (WLAN) in a manner transparent to the WLAN. The method comprises establishing, by the security gateway, a secure tunnel through the WLAN to a wireless communication device served over the WWAN by a WWAN base station, based on the WWAN base station sending a message to the wireless communication device to establish the secure tunnel. The method also comprises forwarding bearer traffic between the wireless communication device and the WWAN base station on a per bearer basis, via the secure tunnel and a connection between the security gateway and the WWAN base station.

In some embodiments, such establishing comprises establishing the secure tunnel based on the WWAN base station authenticating establishment of the secure tunnel. In these and other embodiments, for example, the method at the security gateway may further entail receiving from the wireless communication device address information of the WWAN base station and information mapped to security credentials that the wireless communication device and the WWAN base station use for communication over the WWAN. The method may also comprise receiving from the wireless communication device a request for the security gateway to establish the secure tunnel. Responsive to this request, the method may include initiating authentication of the secure tunnel establishment towards the WWAN base station using the address information, by sending to the WWAN base station an authentication request that includes the information mapped to the security credentials. The method may also include forwarding authentication signaling between the WWAN base station and the wireless communication device as part of the WWAN base station authenticating the secure tunnel establishment based on the security credentials.

In some embodiments, the information mapped to the security credentials comprises address information of the wireless communication device. Alternatively or additionally, the information mapped to the security credentials may comprise an identity of a WWAN context that is maintained at the WWAN base station for the wireless communication device and that includes the security credentials.

In some embodiments, the method may also comprise receiving keying material for the secure tunnel from the WWAN base station. This keying material may be based on the security credentials. In this case, forwarding the authentication signaling may comprises protecting the confidentiality and/or integrity of the secure tunnel using the received keying material. For example, in one embodiment, the received keying material is derived from the security credentials.

Other embodiments herein include a method implemented by a base station of a wireless wide area network (WWAN) for per-bearer switching of bearer traffic between the WWAN and a wireless local area network (WLAN) in a manner transparent to the WLAN. The method comprises sending a message, to a wireless communication device served over the WWAN by the base station, to establish a secure tunnel through the WLAN between the security gateway and the wireless communication device. The method further comprises switching bearer traffic for the wireless communication device between the WWAN and the WLAN on a per bearer basis, with bearer traffic switched to the WLAN being transported over a connection with the security gateway and through the secure tunnel.

In some embodiments, the method further comprises establishing the connection with the security gateway.

In some embodiments, the method further comprises authenticating establishment of the secure tunnel.

In one or more embodiments, the method further comprises receiving from the security gateway an authenticating request that includes information mapped to security credentials that the wireless communication device and the WWAN base station use for communication over the WWAN, identifying the security credentials mapped at the base station to the information, and authenticating the establishment of the secure tunnel based on the security credentials.

Still other embodiments herein include a method implemented by a wireless communication device served by a base station of a wireless wide area network (WWAN) for per-bearer switching of bearer traffic between the WWAN and a wireless local area network (WWAN) in a manner transparent to the WLAN. The method comprises establishing, by the wireless communication device, a secure tunnel through the WLAN to a security gateway, based on the wireless communication device receiving a message from the WWAN base station to establish the secure tunnel. The method also comprises switching bearer traffic for the wireless communication device between the WWAN and the WLAN on a per bearer basis, with bearer traffic switched to the WLAN being transported through the secure tunnel and over a connection between the security gateway and the WWAN base station.

In some embodiments, such establishing comprises establishing the secure tunnel based on the WWAN base station authenticating establishment of the secure tunnel.

In some embodiments, the method also comprises sending from the wireless communication device to the security gateway address information of the WWAN base station and information mapped to security credentials that the wireless communication device and the WWAN base station use for communication over the WWAN. In this case, the method may also comprise sending from the wireless communication device to the security gateway a request for the security gateway to establish the secure tunnel. Moreover, the method may comprise exchanging authentication signaling between the wireless communication device and the WWAN base station as part of the WWAN base station authenticating the secure tunnel establishment based on the security credentials.

In one or more embodiments, for example, the information mapped to the security credentials may comprise address information of the wireless communication device and/or an identity of a WWAN context that is maintained at the WWAN base station for the wireless communication device and that includes the security credentials.

Alternatively or additionally, the method may further comprise obtaining keying material for the secure tunnel based on the security credentials and protecting the confidentiality and/or integrity of the secure tunnel using the keying material. In one embodiment, for instance, the keying material is derived from the security credentials.

The switching at the base station and/or the wireless communication device in some embodiments may comprise distinguishing bearer traffic of different bearers based on different address information of the base station identifying different bearers and/or different address information of the wireless communication device identifying different bearers. Alternatively or additionally, such switching may comprise distinguishing bearer traffic of different bearers based on a source transport layer port of the bearer traffic, a destination transport layer port of the bearer traffic, or a combination of both. In one embodiment, for instance, this transport layer port comprises a User Datagram Protocol (UDP) port.

In any of these embodiments, the message may indicate that traffic for a subset of bearers is to be switched to WLAN. Alternatively or additionally, the message may include information to establish the secure tunnel through the WLAN. Alternatively or additionally, the message may include address information of the security gateway and/or address information of the base station. In still other embodiments, the message may alternatively or additionally include information mapped to security credentials that the wireless communication device and the base station use for communication over the WWAN. This information mapped to the security credentials may for instance comprise address information of the wireless communication device and/or an identity of a WWAN context that is maintained at the base station for the wireless communication device and that includes the security credentials.

In any of these embodiments, the message may be an RRC connection reconfiguration message.

In any of these embodiments, the secure tunnel may be an IPSec tunnel.

In any of these embodiments, a bearer may comprise comprises a bearer between the WWAN base station and a serving gateway that terminates an interface towards a radio access network associated with the WWAN.

In any of these embodiments, per-bearer switching may occur above a PDCP level.

In any of these embodiments, the security gateway may be collocated with an evolved Packet Data Gateway (ePDG) in a system that is or evolves from a $3^{rd}$ Generation Partnership Project (3GPP) system. Alternatively or additionally, the security gateway may be collocated with a SIPTO or LIPA local gateway (L-GW). In other embodiments, the security gateway may be a standalone gateway.

In any of these embodiments, the WWAN may a 3GPP network and the WLAN may be a non-3GPP network.

The WLAN network may be a WiFi network and/or a non-trusted network.

Embodiments also include corresponding apparatus, computer programs, and carriers.

In certain 3GPP-based embodiments, for example, an intermediate node (the IPsec SeGW, or for example the ePDG) is used during tunnel establishment between the eNB and the UE, for the purposes of access aggregation. The intermediate node helps protect the privacy of the eNB, while at the same time keeping the tunnel establishment functionality intact.

As an example, certain embodiments provide support for standalone IPsec SeGW (Security Gateway) for the solution in which legacy WLAN APs are used for transparent aggregation between the UE and the eNB. The UE in some embodiments establishes an IPsec tunnel towards the IPsec SeGW and provides one identity indicating the current eNB and another identity identifying the UE context at that eNB. The IPsec SeGW uses the eNB identity to contact the correct eNB to authenticate the IPsec tunnel establishment. The IPsec SeGW also provides an identity of the UE to the eNB that uses this identity to locate the correct UE context and then perform an authentication of the UE based on the KeNB stored in the UE context. Finally, some embodiments also provide the possibility to offload multiple bearers to the IPsec connection as those embodiments enable the possibility to identify different bearers on the connection between the UE and the eNB.

The standalone IPSec SeGW can be combined for example with or (SIPTO or LIPA) L-GW. Note that full support of SIPTO offloading may require further support with possibly using only part of the signaling herein. Those details are covered by the scope of this disclosure.

DETAILED DESCRIPTION

Figure 1:
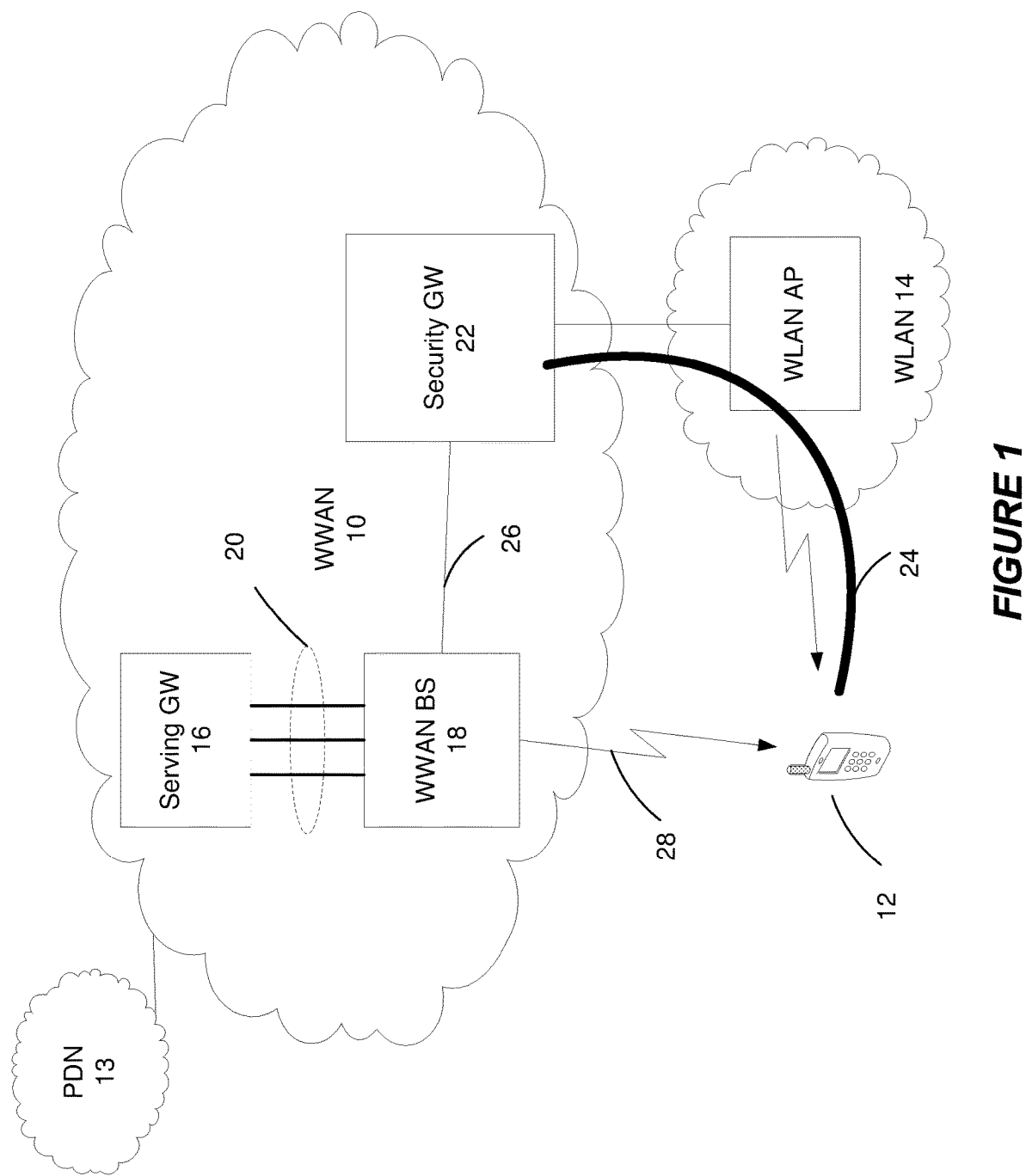
FIG. 1 is a block diagram of a wireless communication system according to one or more embodiments.

FIG. 1 illustrates a wireless communication system according to one or more embodiments. The system includes a wireless wide area network (WWAN) 10 such as an LTE network that serves a wireless communication device 12. The WWAN 10 is connected to a packet data network (PDN) 13 such as an IP Multimedia Subsystem or the Internet. The system also includes a wireless local area network (WLAN) 14 such as a WiFi network. The WWAN 10 includes a serving gateway (GW) 16 (e.g., a S-GW in an LTE network) that transports traffic for the device 12 to and/or from a WWAN base station (BS) 18 (e.g., an eNodeB) over one or more bearers 20 (e.g., E-RAB bearers in LTE).

The system supports per-bearer switching of bearer traffic between the WWAN 10 and the WLAN 14 in a manner that is transparent to the WLAN 14. In at least some embodiments, for example, the WWAN base station 18 serving the device 12 switches bearer traffic on a per bearer basis such that traffic belonging to one bearer may be transmitted over the WWAN 10 whereas traffic belonging to a different bearer may be transmitted over the WLAN 14 at the same or a different time, to thereby aggregate WWAN and WLAN links. The WWAN base station 18 in this regard may offload traffic from a subset (i.e., portion) of the bearers 20 for transport over the WLAN 14, e.g., based on information about the channel quality or loading of the WWAN 10 and/or WLAN 14. This switching may occur transparent to the WLAN 14 in the sense that the WLAN 14 need not be aware of the per-bearer switching and therefore may be a so-called legacy WLAN that need not be modified or upgraded to support it.

Figure 2:
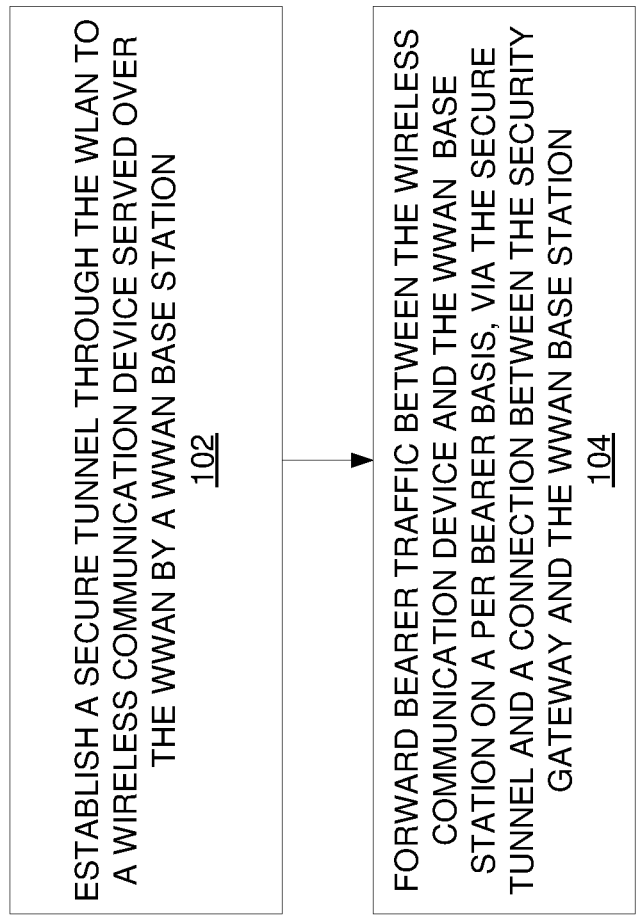
FIG. 2 is a logic flow diagram of a method performed by a security gateway according to some embodiments.

Notably, the system includes a security gateway 22, e.g., in the WWAN 10, that supports this per-bearer switching. FIG. 2 illustrates processing 100 performed by the security gateway 22 in this regard according to one or more embodiments.

As shown, the security gateway 22 establishes a secure tunnel 24 (e.g., an IPSec tunnel) through the WLAN 14 to the device 12 served over the WWAN 10 by the WWAN base station 18 (Block 102). The security gateway 22 may establish this secure tunnel 24 based on the WWAN base station 18 sending a message 28 to the device 12 to establish the tunnel 24, e.g., as part of a process in which the WWAN base station 18 triggers and/or authenticates establishment of the tunnel 24. In some embodiments, therefore, the security gateway 22 establishes the secure tunnel 24 based on the WWAN base station 18 authenticating establishment of the secure tunnel 24. Regardless, with this tunnel 24 established, the security gateway 22 forwards bearer traffic between the wireless communication device 12 and the WWAN base station 18 on a per bearer basis, via the secure tunnel 24 and a connection 26 between the security gateway 22 and the WWAN base station 18 (Block 104).

Figure 3:
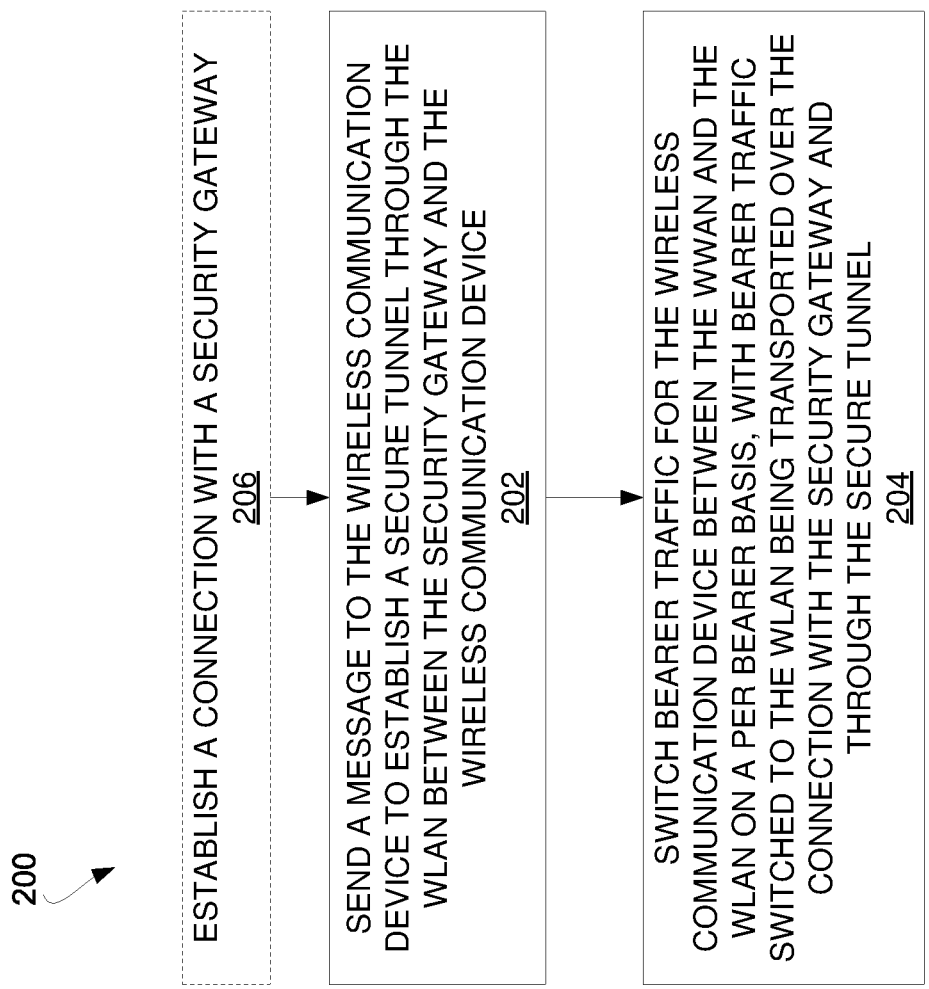
FIG. 3 is a logic flow diagram of a method performed by a WWAN base station according to some embodiments.

FIG. 3 illustrates corresponding processing 200 implemented at the WWAN base station 18 for per-bearer switching of bearer traffic between the WWAN 10 and the WLAN 14 in a manner transparent to the WLAN 14. As shown, the WWAN base station 18 sends a message 28, to the wireless communication device 12 served over the WWAN 10 by the base station 18, to establish the secure tunnel 24 through the WLAN 14 between the security gateway 22 and the device 12 (Block 202), e.g., as part of a process in which the WWAN base station 18 triggers and/or authenticates establishment of the tunnel 24. In some embodiments, therefore, the processing 202 entails the WWAN base station 18 authenticating establishment of the secure tunnel 24. Regardless, the base station 18 also switches bearer traffic for the wireless communication device 12 between the WWAN 10 and the WLAN 14 on a per bearer basis, with bearer traffic switched to the WLAN 14 being transported over a connection 26 with the security gateway 22 and through the secure tunnel 24 (Block 204). In some embodiments, processing 200 may thereby include the WWAN base station 18 establishing this connection 26 with the security gateway 22 (Block 206).

Figure 4:
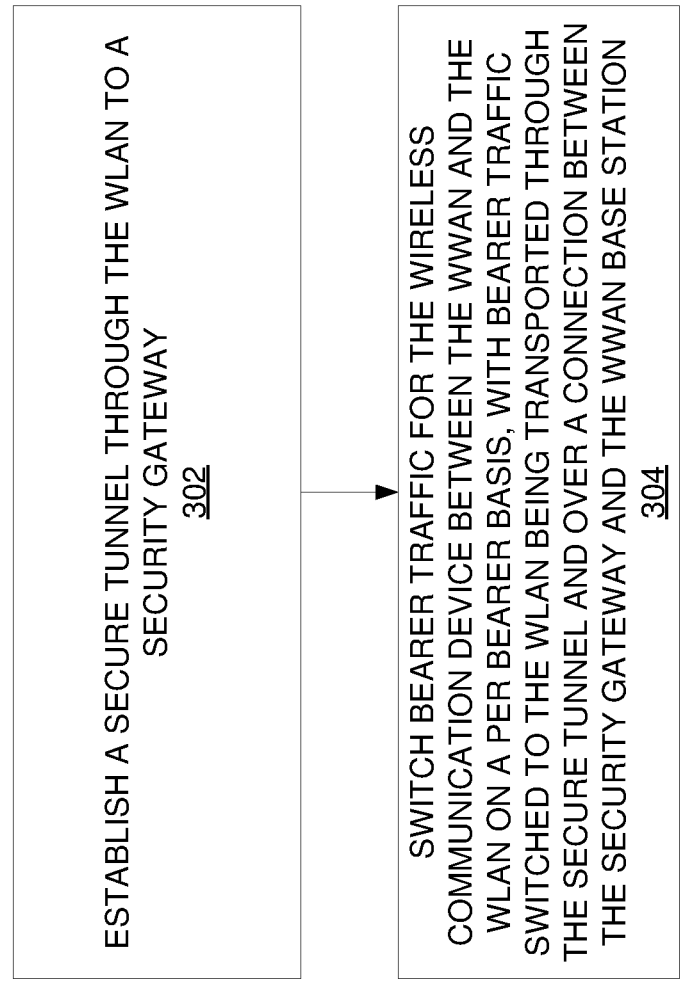
FIG. 4 is a logic flow diagram of a method performed by a wireless communication device according to some embodiments.

Moreover, FIG. 4 illustrates corresponding processing 300 performed by the device 12 for per-bearer switching of bearer traffic between the WWAN 10 and the WLAN 14 in a manner transparent to the WLAN 14. As shown, the device 12 establishes a secure tunnel 24 through the WLAN 14 to a security gateway 22 (Block 302). The device 12 may establish this secure tunnel 24 based on the device 12 receiving a message 28 from the WWAN base station 18 to establish the tunnel 24, e.g., as part of a process in which the WWAN base station 18 triggers and/or authenticates establishment of the tunnel 24. In some embodiments, therefore, the device 12 establishes the secure tunnel 24 based on the WWAN base station 18 authenticating establishment of the secure tunnel 24. Regardless, the device 12 then switches bearer traffic for the wireless communication device 12 between the WWAN and the WLAN on a per bearer basis, with bearer traffic switched to the WLAN being transported through the secure tunnel 24 and over a connection 26 between the security gateway and the WWAN base station (Block 304).

In at least some embodiments, the message 28 from the WWAN base station 18 to the device 12 triggers establishment of the secure tunnel 24. For example, the message 28 to the wireless communication device 12 may indicate that traffic for a subset of bearers 20 is to be switched from the WWAN 10 to WLAN 14 (e.g., see Step 3 in FIG. 11A). That is, the message 28 may indicate that bearer switching is to be performed. The message 28 may thereby trigger the device 12 to establish the tunnel 24.

Alternatively or additionally, the message 28 from the WWAN base station 18 to the device 12 may include information to establish the secure tunnel 24 through the WLAN 14. In one or more embodiments, for example, the base station 18 sends address information of the security gateway 22 (e.g., an IP address for the gateway 22) to the wireless communication device 12, e.g., within a message 28 indicating bearer switching is to be performed. Alternatively or additionally, the base station may send address information of the base station 18 (e.g., an IP address for the base station 18) to the device 12, e.g., within a message 28 indicating bearer switching is to be performed.

Alternatively or additionally, the base station 12 may send to the wireless communication device 12 information mapped to security credentials that the wireless communication device 12 and the base station 18 use for communication over the WWAN 10. This information may comprise for example address information of the wireless communication device 12 and/or an identity of a WWAN context that is maintained at the base station 18 for the wireless communication device 12 and that includes the security credentials. Regardless, this information may also be included within a message 28 indicating bearer switching is to be performed.

In some embodiments, the base station 18 sends to the device 12 different address information of the base station 18 (e.g., different UDP port numbers) identifying different bearers 20.

Figure 11A:
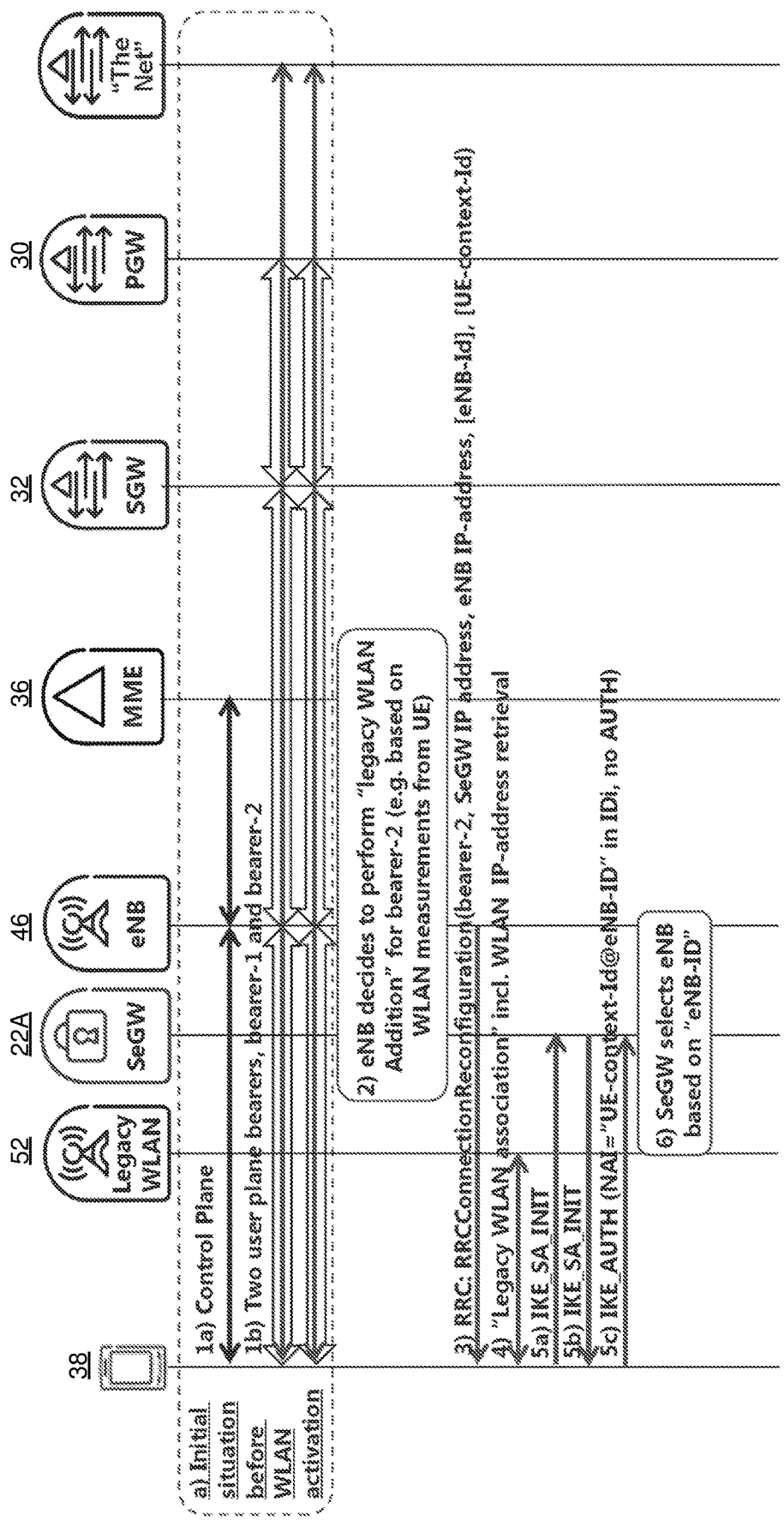
FIGS. 11A-B illustrate a call diagram of a process for per-bearer switching of bearer traffic between a WWAN and WLAN according to some embodiments.

Regardless, in one or more embodiments, responsive to a message 28 indicating bearer switching is to be performed, the device 12 sends a request to the security gateway 22 for the gateway 22 to establish the secure tunnel 24 (see, e.g., Step 5a in FIG. 11A). Within this request or a different message, the device 12 in some embodiments also sends to the gateway 22 address information of the WWAN base station 18 (e.g., eNB-ID) and information mapped to security credentials that the wireless communication device 12 and the WWAN base station 18 use for communication over the WWAN 10 (e.g., a UE-Context-ID).

In some embodiments, responsive to this request from the device 12, the gateway 22 initiates authentication of the secure tunnel establishment towards the WWAN base station 18 using the address information. The gateway 22 may for instance do so by sending to the WWAN base station 18 an authentication request that includes said information (see, e.g., step 7 in FIG. 11B).

Figure 11B:
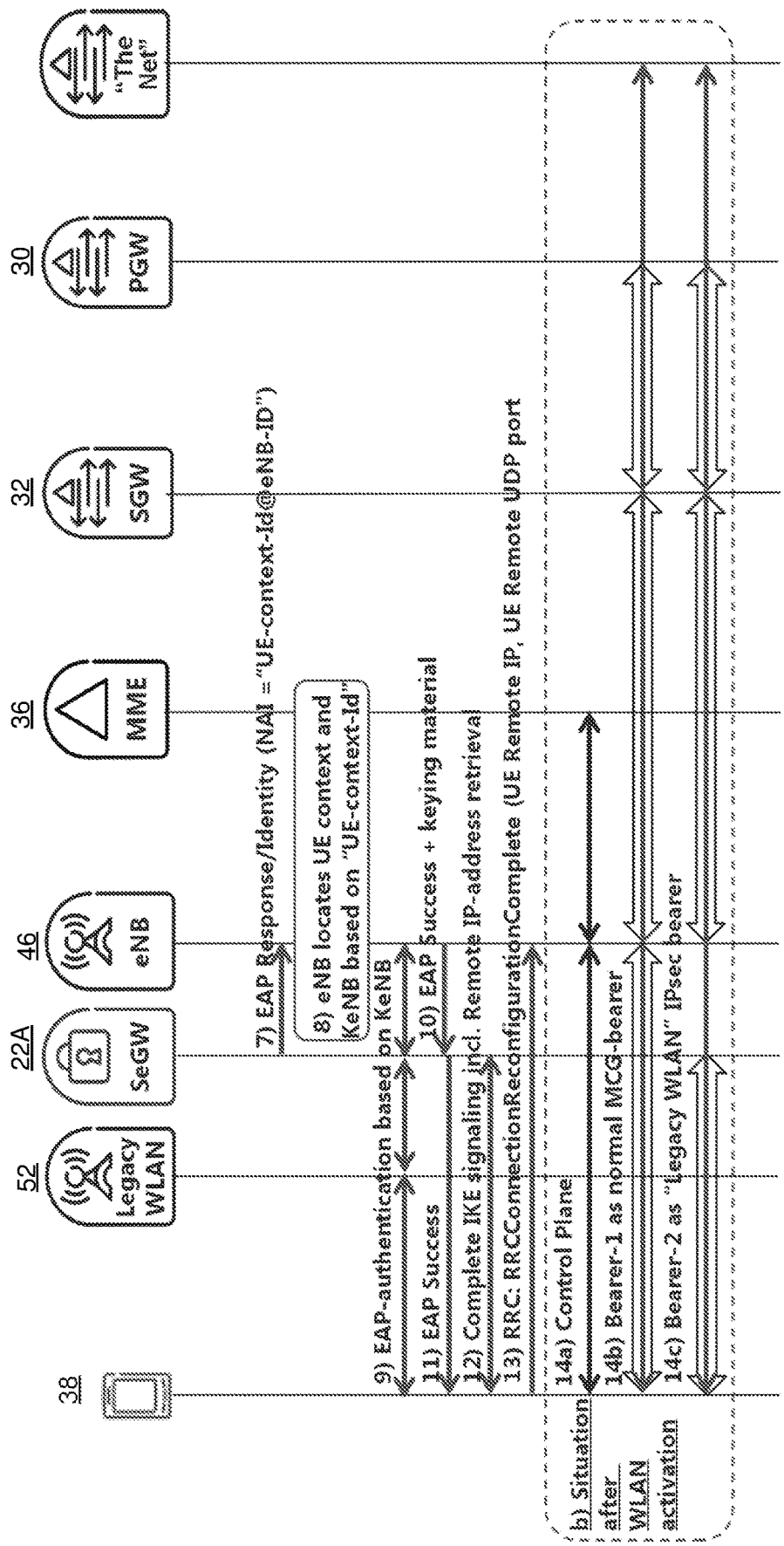

The base station 18 in some embodiments identifies the security credentials (e.g., KeNB) mapped at the base station to said information (e.g., step 8 in FIG. 11B). The gateway 22 then forwards authentication signaling between the WWAN base station 18 and the wireless communication device 12 as part of the WWAN base station 18 authenticating the secure tunnel establishment based on said security credentials (see, e.g., step 9 in FIG. 11B). The base station 18 through this process authenticates the establishment of the secure tunnel 24 based on the security credentials.

The base station 18 upon successful authentication in at least some embodiments distributes keying material for securing the tunnel 24 to the device 12 and the gateway 22 (see, e.g., Step 10 and 11 of FIG. 11B). In at least some embodiments, for example, the keying material is based on said security credentials (e.g., by being derived from it). Regardless, the keying material may be used to protect the confidentiality and/or integrity of the secure tunnel 24.

With the tunnel established, the base station 18 and device 12 may switch traffic on a per bearer basis, e.g., by distinguishing the bearer traffic of different bearers 20 (e.g., see steps 14a-c in FIG. 11B). In one or more embodiments, for example, such distinguishing may be based on different address information of the base station 18 identifying different bearers and/or different address information of the wireless communication device 12 identifying different bearers. In this or other embodiments, for example, distinguishing bearer traffic of different bearers may be based on a source transport layer port of the bearer traffic, a destination transport layer port of the bearer traffic, or a combination of both. Such a transport layer port may comprise for instance a User Datagram Protocol (UDP) port.

Various embodiments will now be described with occasional reference to one or more wireless standards or protocols. These references are purely for exemplary purposes and are to be seen as non-limiting.

Figure 5:
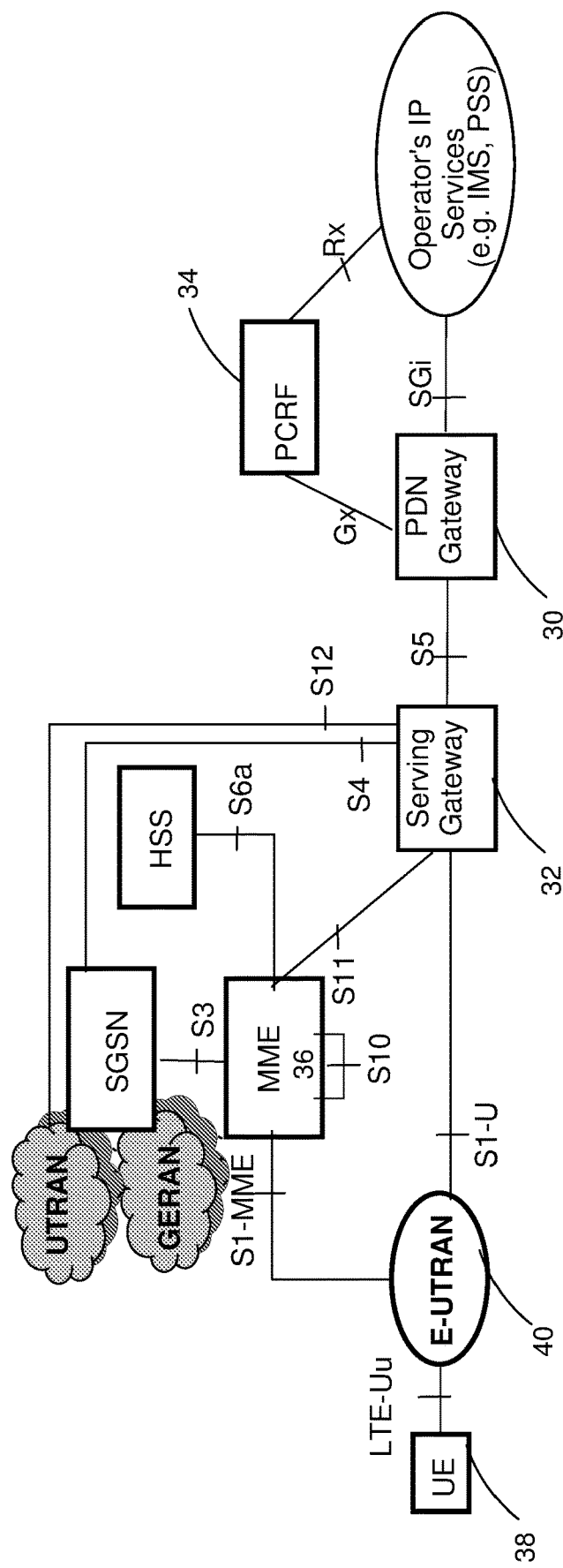
FIG. 5 is a block diagram of an evolved packet core according to some embodiments.

FIG. 5 shows an overview of the Evolved Packet Core (EPC) architecture. This architecture is defined in 3GPP TS 23.401. See that specification for a definition of the PGW 30 (PDN Gateway), SGW 32 (Serving Gateway), PCRF 34 (policy controller), MME 36 (Mobility Management Entity) and mobile device 38 (UE). The SGW 32 and PGW 30 are logical gateways that may be implemented in one physical node or separated physical nodes. The SGW 32 is the gateway which terminates the interface towards the LTE radio access, E-UTRAN 40 (the E-UTRAN, consists of one or more eNBs). For each UE 38 associated with the EPS, at a given point of time, there is a single SGW 32. The PGW 30 is the gateway which terminates the SGi interfaces towards the packet data network (PDN), e.g., an IP Multimedia System (IMS), Packet switched services (PSS), etc.

There are several types of UE associations needed in the eNB: the "eNB UE Context" used to store all information needed for a UE 38 in active state and the associations between the UE 38 and the logical S1 and x2 connections used for S1/x2-AP UE associated messages. An eNB UE context is a block of information in an eNB associated to one active UE 38. The block of information contains the necessary information required to maintain the E-UTRAN services towards the active UE 38. At least UE state information, security information, UE capability information and the identities of the UE-associated logical S1-connection shall be included in the eNB UE context.

Figure 6:
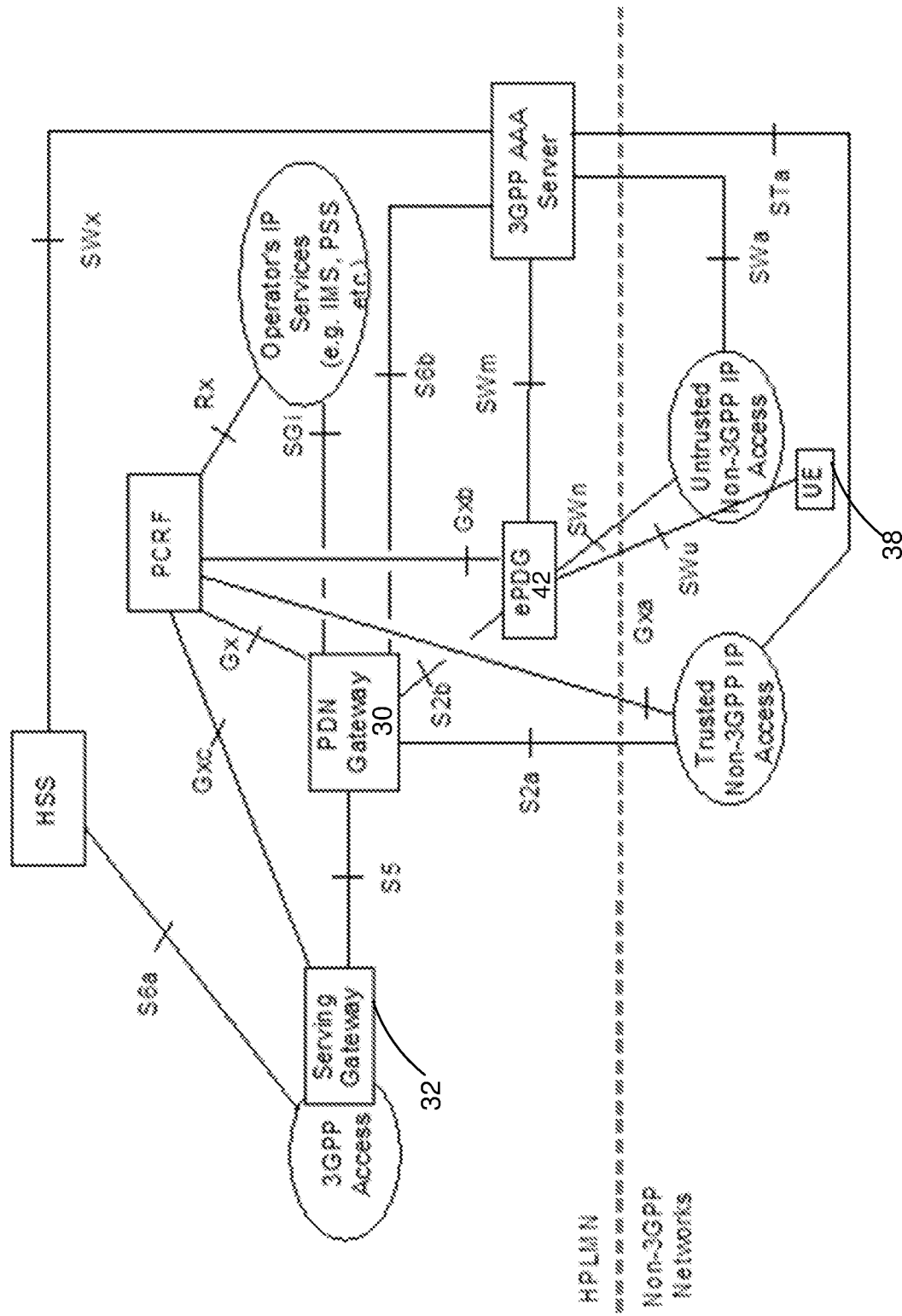
FIG. 6 is a block diagram of an evolved packet core for 3GPP accesses, according to some embodiments.

FIG. 6 more particularly shows the EPC architecture for 3GPP accesses. In those accesses the radio interface is specified by 3GPP, e.g. LTE. FIG. 6 shows an extension to the EPC architecture in order to allow also non-3GPP accesses. In such access the radio interface is not specified by 3GPP, e.g. WLAN. See 3GPP TS 23.402.

A non-3GPP access may be trusted or untrusted. The exact definition of trusted or untrusted is given in the 3GPP specifications. Simplified, one can say that a trusted access is managed by an operator (e.g. an operator hotspot) whereas an untrusted access is not managed by the operator (e.g. a WiFi access point at home). In a non-3GPP access a security gateway called ePDG 42 is used between the untrusted domain and the operator's network. The ePDG 42 allocates a remote IP address as an IP address local to the ePDG 42 which is used as care-of-address (CoA) when S2c is used. The ePDG 42 also performs de-capsulation and encapsulation of packets for IPSec, and if network based mobility (S2b) is used, for GTP or PMIPv6 tunnels. The UE 38 sets up a secure tunnel to the ePDG 42 (using Swu-interface), and there is the S2b interface between ePDG 42 and PGW 30. A trusted 3GPP access hosts a gateway, namely a trusted wireless access gateway (TWAG) (see TS 23.402 section 16). There is a point-to-point interface between UE 38 and TWAG, and the S2a interface between TWAG and PGW.

Most current WLAN (or WiFi, as used interchangeably herein) deployments are totally separate from mobile networks, and can be seen as non-integrated from the terminal perspective. Most operating systems (OSs) for UEs such as Android™ and iOS®, support a simple Wi-Fi offloading mechanism where a UE immediately switches all its IP traffic to a Wi-Fi network upon a detection of a suitable network with a received signal strength above a certain level. Henceforth, the decision to offload to a Wi-Fi or not is referred to as access selection strategy and the term "Wi-Fi-if-coverage" is used to refer to the aforementioned strategy of selecting Wi-Fi whenever such a network is detected.

There are several drawbacks of the "Wi-Fi-if-coverage" strategy. First, though the user/UE can save previous pass codes for already accessed Wi-Fi Access Points (APs), hotspot login for previously non-accessed APs usually requires user intervention, either by entering the pass code in Wi-Fi Connection Manager (CM) or using a web interface. The connection manager is software on a UE that is in charge of managing the network connections of the terminal, taking into account user preferences, operator preferences, network conditions, etc.

Second, no consideration of expected user experience is made except those considered in the UE implemented proprietary solution, and this can lead to a UE being handed over from a high data rate mobile network connection to a low data rate Wi-Fi connection. Even though the UE's OS or some high level software is smart enough to make the offload decisions only when the signal level on the Wi-Fi is considerably better than the mobile network link, there can still be limitations on the backhaul of the Wi-Fi Access Point (AP) that may end up being the bottleneck.

Third, no consideration of the load conditions in the mobile network and Wi-Fi are made. As such, the UE might still be offloaded to a Wi-Fi AP that is serving several UEs while the mobile network (e.g. LTE) that it was previously connected to is rather unloaded.

Fourth, interruptions of on-going services can occur due to the change of IP address when the UE switches to the Wi-Fi network. For example, a user who started a Voice over IP (VoIP) call while connected to a mobile network is likely to experience a call drop when arriving home and the UE switching to the Wi-Fi network automatically. Though some applications are smart enough to handle this and survive the IP address change (e.g. Spotify®), the majority of current applications do not. This places a lot of burden on application developers if they have to ensure service continuity.

Fifth, no consideration of the UE's mobility is made. Due to this, a fast moving UE can end up being offloaded to a Wi-Fi AP for a short duration, just to be handed over back to the mobile network. This is specially a problem in scenarios like cafes with open Wi-Fi, where a user walking by or even driving by the cafe might be affected by this. Such ping pong between the Wi-Fi and mobile network can cause service interruptions as well as generate considerable unnecessary signaling (e.g. towards authentication servers).

Recently, Wi-Fi has been subject to increased interest from cellular network operators, not only as an extension to fixed broadband access. The interest is mainly about using the Wi-Fi technology as an extension, or alternative to cellular radio access network technologies to handle the always increasing wireless bandwidth demands. Cellular operators that are currently serving mobile users with, e.g., any of the 3GPP technologies, LTE, UMTS/WCDMA, or GSM, see Wi-Fi as a wireless technology that can provide good support in their regular cellular networks. The term "operator-controlled Wi-Fi" points to a Wi-Fi deployment that on some level is integrated with a cellular network operator's existing network and where the 3GPP radio access networks and the Wi-Fi wireless access may even be connected to the same core network and provide the same services.

There is currently quite intense activity in the area of operator-controlled Wi-Fi in several standardization organizations. In 3GPP, activities to connect Wi-Fi access points to the 3GPP-specified core network is pursued, and in Wi-Fi alliance, WFA, activities related to certification of Wi-Fi products are undertaken, which to some extent also is driven from the need to make Wi-Fi a viable wireless technology for cellular operators to support high bandwidth offerings in their networks. The term Wi-Fi offload is commonly used and points towards that cellular network operators seek means to offload traffic from their cellular networks to Wi-Fi, e.g., in peak-traffic-hours and in situations when the cellular network for one reason or another needs to be off-loaded, e.g., to provide requested quality of service, maximize bandwidth or simply for coverage.

LTE-WLAN aggregation (LWA) is a feature wherein the UE may receive and transmit using links to both eNB and WLAN. This feature is currently being standardized by 3GPP in Release 13. There are different architecture options for LTE-WLAN aggregation. In the split bearer architecture option, denoted also by option 3C, data is split in the packet data convergence protocol (PDCP) layer. For the downlink direction, this split is done in the eNB. The eNB may dynamically decide how to route PDCP packet data units (PDUs) to the UE—either to the UE directly using LTE RLC, LTE MAC, and LTE PHY, or via a backhaul channel to WLAN and then to the UE using 802.11 MAC and 802.11 PHY. In the separate bearer architecture (also denoted 2C), the lower layers of a bearer are switched to LTE or WLAN meaning PDCP packets of that bearer are all routed either via LTE or WLAN side.

Figure 7:
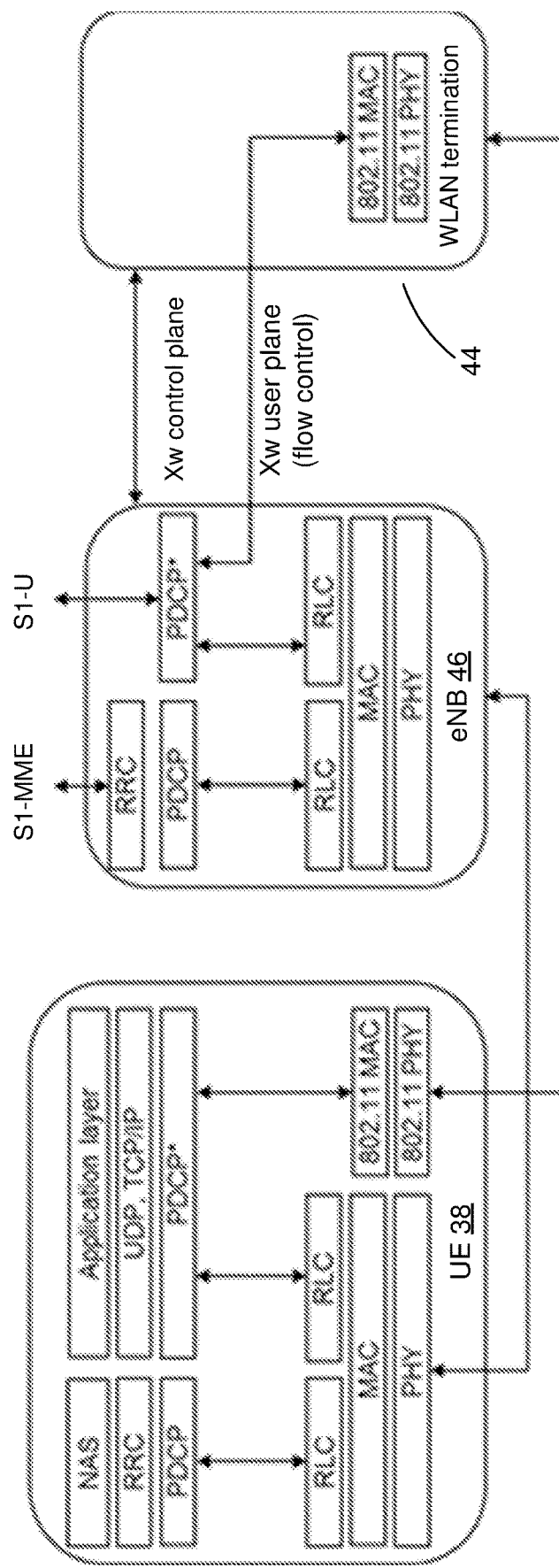
FIG. 7 is a block diagram of a protocol architecture for LTE-WLAN aggregation according to some embodiments.

FIG. 7 shows a protocol architecture for LTE-WLAN aggregation. The WLAN termination (WT) point 44 in the network may be implemented by an WLAN access point (AP) and/or access controller (AC) or a further network node. The interface protocol between eNB 46 and WT 44 is denoted Xw.

Furthermore, a GTP-U tunnel is established per UE between eNB 46 and WT 44 and that e.g. flow control feedback would come from the WT 44 to the eNB 46. The LTE-WLAN aggregation function in the WT 44 would receive PDCP PDUs with bearer ID included from the eNB 46. These PDCP PDUs would be encapsulated into Ether-frames and given to WLAN MAC.

From the eNB perspective, the network interface, e.g. Xw is always to WT 44. However, the UE 38 is always connected to an AP and there may be multiple APs behind one WT 44. Further, in legacy WLAN deployments the UE 38 is controlling the mobility decisions between different WLAN nodes, while for WLAN/LTE aggregation eNB 46 controls, to some extent, the mobility between WLAN nodes.

The eNB 46 will control the mobility between WLAN nodes by configuring the UE 38 with one or more WLAN identifiers (e.g. SSIDs, HESSIDs, BSSIDs). This is defined as a mobility set. The eNB 46 can add and remove WLANs from the UE's mobility set for example based on UE provided WLAN measurements. For example the UE 38 should report to the network when a WLAN becomes good enough to be used (and then that WLAN may be added to the mobility set by the eNB 46) and report to the network when a WLAN becomes too poor to be used (and then that WLAN may be removed from the mobility set by the eNB 46). It should be noted that the eNB 46 may also apply other criteria when deciding when to add/remove WLANs from the UE's mobility set.

Figure 8:
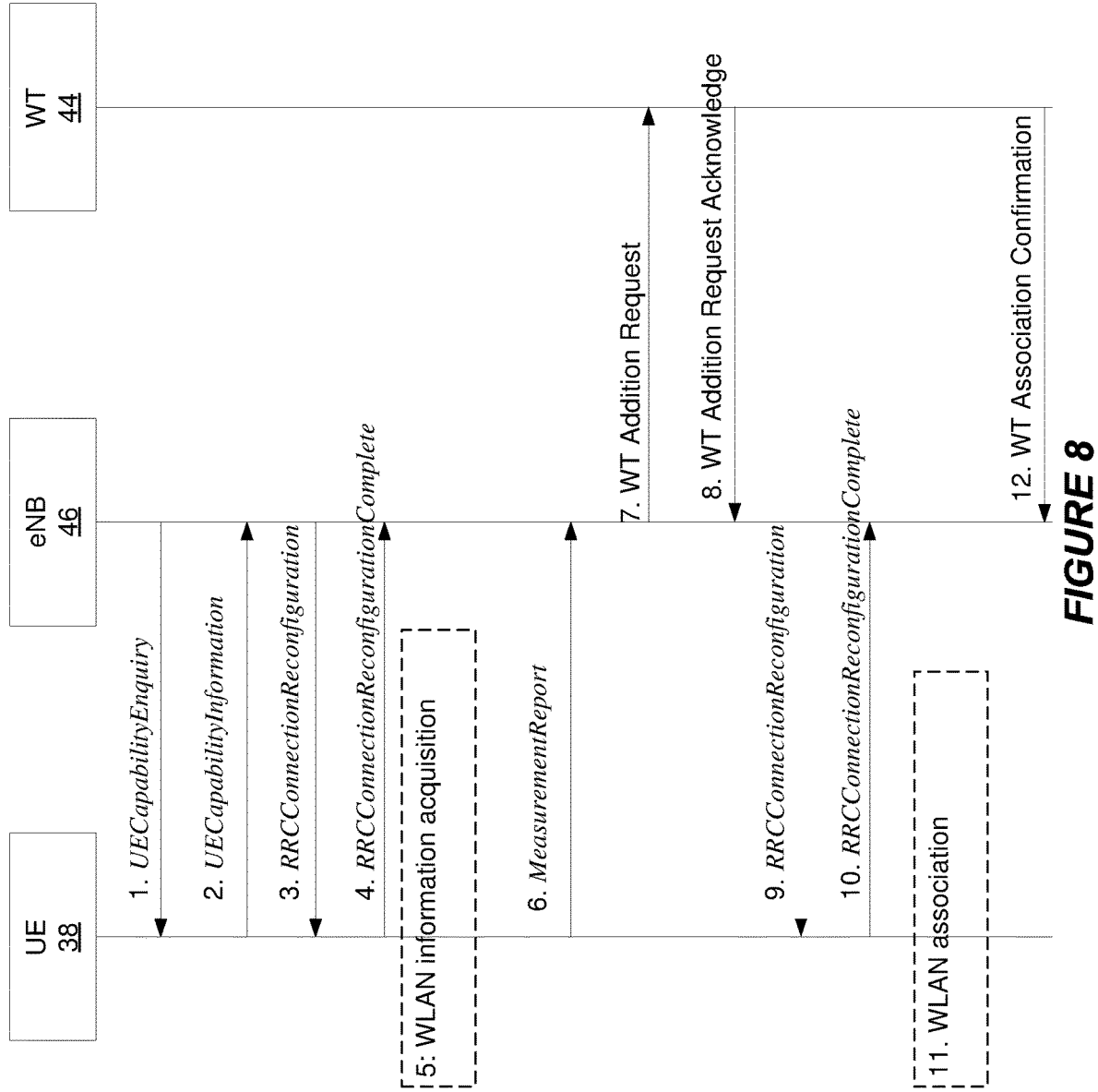
FIG. 8 is a call flow diagram of initiation of LTE-WLAN aggregation according to some embodiments.

Initiation of the LTE-WLAN aggregation according to some embodiments is depicted in FIG. 8. As shown in FIG. 8, a UE 38 is first configured with measurements (Steps 1-4) and after providing measurement results (Steps 5-6), the eNB 46 may decide to initiate the aggregation. After that decision, the eNB 46 performs WT addition (Step 7) to prepare the WLAN connectivity. After receiving acknowledgement (Step 8), the eNB 46 may configure the UE 38 with LWA (Steps 9-10). In the RRC message to the UE 38 (Step 9), the eNB 46 provides the mobility set which determines which WLAN APs the UE 38 should attempt to associate (Steps 11-12).

A new work item (WI) in 3GPP describes a solution for LTE-WLAN integration which allows reuse of legacy WLAN deployments without need for modification. This is achieved by establishing an IPSec tunnel between UE and eNB over WLAN. The eNB would then switch on a per bearer level traffic between LTE and the IPSec tunnel to be transmitted to the UE.

For scenarios where eNB and WLAN nodes are not closely deployed, or in transport network architectures with a central aggregation point, e.g. in the CN (which is typical for example for outdoor eNBs and indoor WLANs), the architecture intended in the new WI does not seem very beneficial. In case of a central aggregation point of the transport network, traffic would e.g. be routed from this central point through eNB back to the central point and then to WLAN. For example, if the mobile operator network is "opened up" or routable only via centrally placed firewalls then all traffic from a legacy WLAN would need to traverse via this central firewall and then be routed to an eNB likely placed far away from the firewall in the cellular operator's network.

Limiting the work item description (WID) to specify an IPsec tunneling solution from UE to eNB is not very flexible.

Furthermore, in order to establish the IPSec tunnel between the eNB and the UE, the eNB will need to be exposed to the UE, usually via its IP address, so that the UE know where to terminate the tunnel. However, this can lead to compromised security in the 3GPP RAN, where nodes are usually protected from access by external entities outside of the operator's network in order to reduce the risk of denial-of-service and other similar attacks. In addition, if the eNB would be directly accessible from the UE in the legacy WLAN side, then this would mean that the eNB would likely by also accessible directly from the Internet, at least in some scenarios.

In the solution when the IPsec tunnel is established to the eNB, it is enough that the UE provides a UE identity to the eNB. The eNB is identified by an eNB IP address towards which the UE establishes the IPsec tunnel.

One or more embodiments herein establish a tunnel from the UE 38 to a separate node, i.e., a security gateway 22. Operators may for instance decide the deployment for this separate node, which provides more flexible deployment options. That is, more flexible deployment options can be envisaged for the endpoint for the IPSec tunnel in the network. As explain more fully below, in some embodiments when the IPsec tunnel is established to such a separate node, it is not enough that the UE 38 provides a UE identity to the separate node; additional information may be needed to identify the current eNB for the UE 38.

Figure 9:
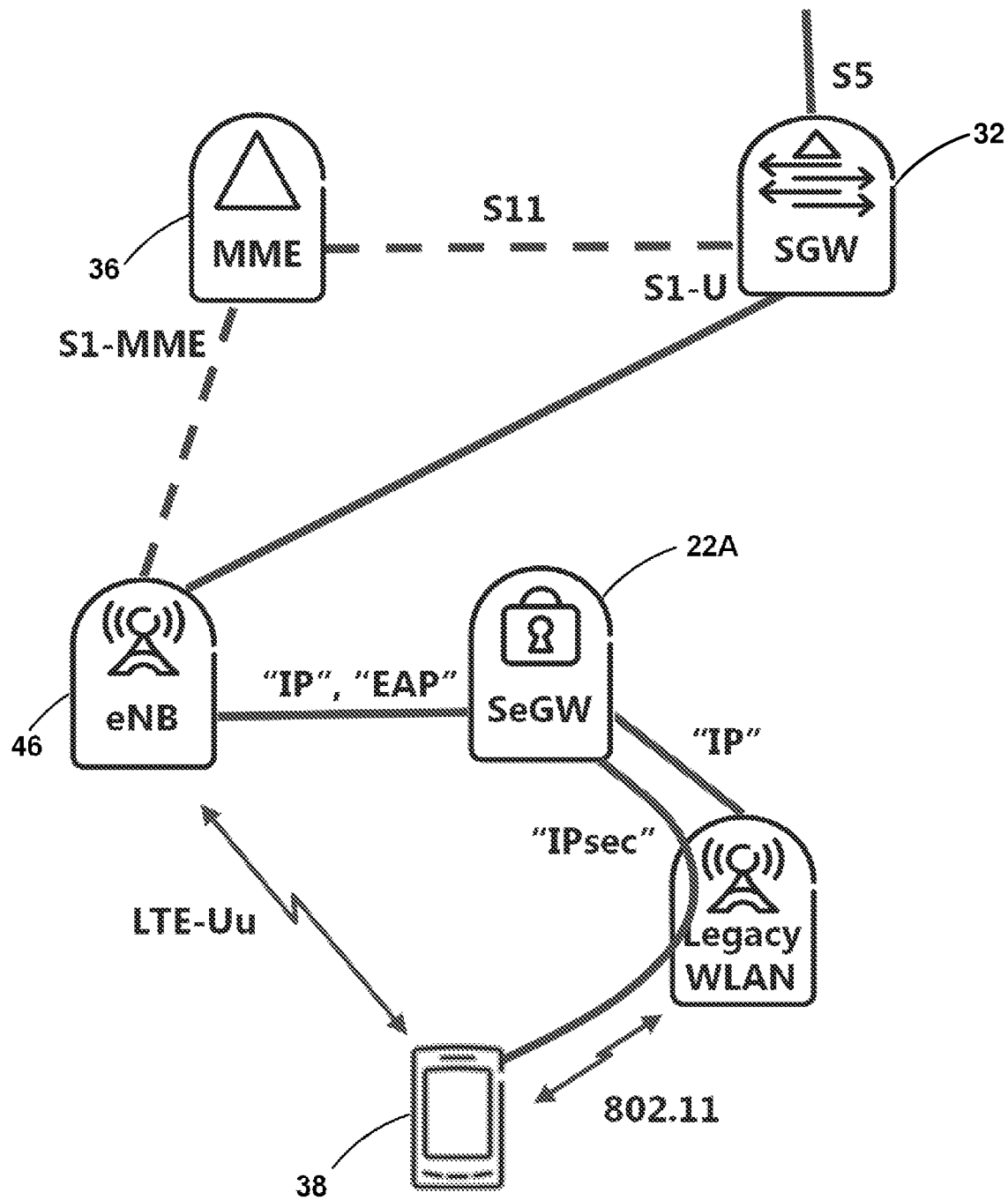
FIG. 9 is a block diagram of the wireless communication system which includes a security gateway according to some embodiments.

The overall architecture for the scenario covered by certain embodiments is shown in FIG. 9. This scenario is called LTE-WLAN IP Tunneling (LWIP). The UE 38 is connected to the eNB 46 via the LTE-Uu interface (as normally). In addition, the UE 38 is able to connect to the eNB 46 via legacy WLAN by establishing an IPsec connection to a security gateway 22, shown in FIG. 9 as the SeGW 22A. The SeGW 22A then provides connectivity to the eNB 46. In addition, in the embodiment shown in FIG. 9, the eNB 46 acts as an authenticator for the IPsec tunnel establishment. This authentication is based on the existing security credentials stored in the eNB 46 (such as KeNB or any information based on the KeNB and possibly information also based on KeNB and additional information available both in the eNB 46 and in the UE 38). The legacy WLAN can be used to offload "complete" bearers.

The "IP" and "EAP" in FIG. 9 describe a new interface between e.g. ePDG 46, to which a bearer is offloaded above the PDCP level from the eNB 46. The new interface is valid for both collocated and non-collocated cases.

Figure 10:
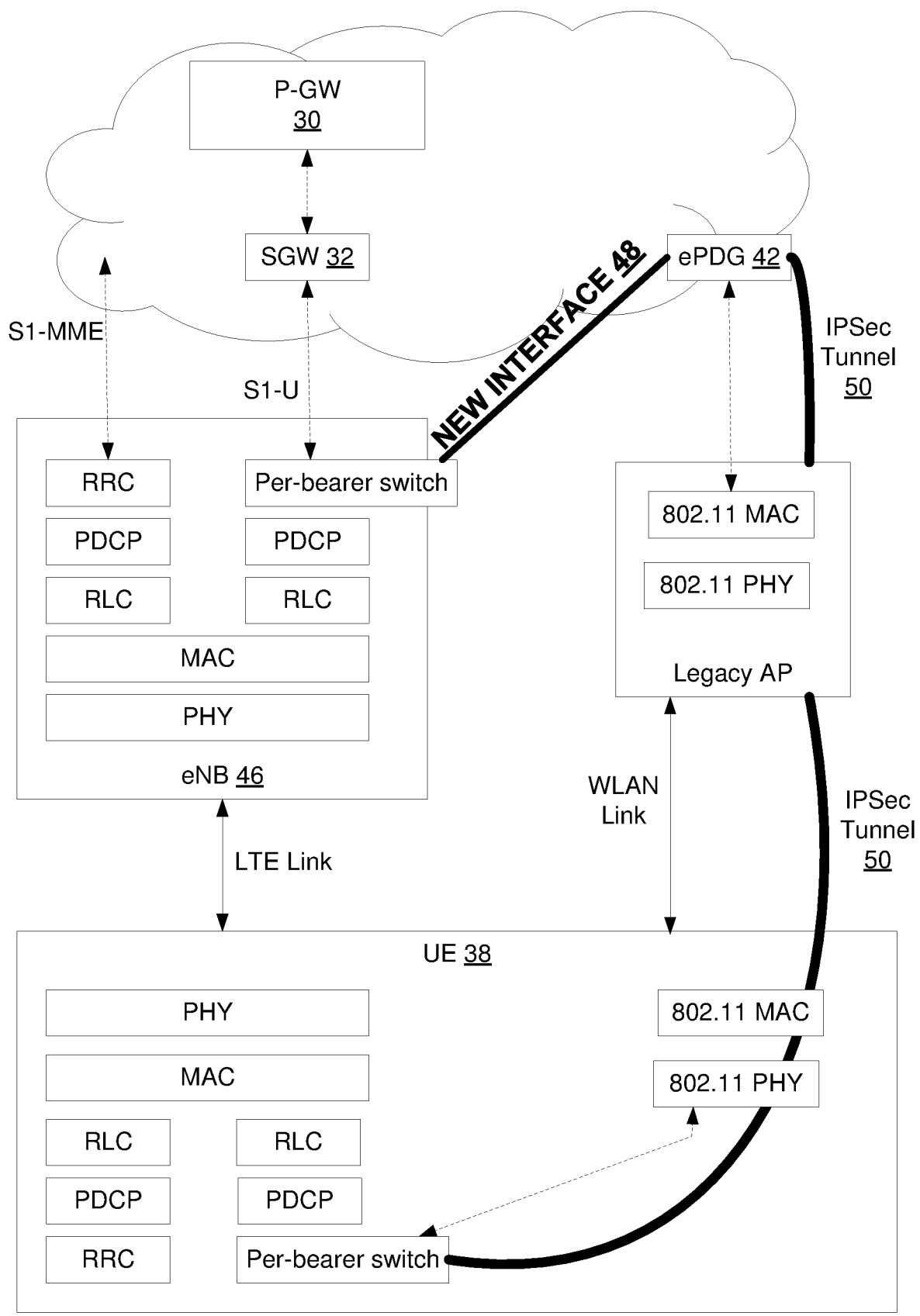
FIG. 10 is a block diagram of a system which includes a security gateway in the form of an ePDG according to some embodiments.

FIG. 10 illustrates an example where the (IPSec) SeGW 22A in FIG. 9 is implemented in the form of the ePDG 42. In FIG. 10, the eNB 46 implements a routing function that determines where traffic shall be sent and sends it accordingly. In particular, for downlink traffic arriving via the S1-interface from the serving gateway, the eNB 46 determines whether the traffic for this bearer should be routed to the UE 38 via WLAN or via LTE. If the traffic in this bearer shall be routed to the UE 38 via WLAN, the eNB 46 routes the traffic in this bearer in the "NEW INTERFACE" 48 to the ePDG 42 (which implements the SeGW 22A in this example). If the traffic in this bearer shall be routed to the UE 38 via LTE, the eNB 46 delivers the data to the PDCP entity associated with this bearer to be sent to the UE 38.

When the ePDG 42 receives the traffic via the new interface 48, the ePDG 42 determines which UE 38 the traffic is for. The ePDG 42 then routes the traffic via an IPsec tunnel 50 for this UE 38.

Upon reception of uplink traffic from an IPsec tunnel 50, the ePDG 42 determines whether this traffic is for WLAN interworking and hence should be routed to the eNB 38. The ePDG 42 in that case routes that traffic to the eNB 46 via the NEW INTERFACE 48. Otherwise the traffic should be forwarded to the PDN-GW 30.

FIGS. 11A-B illustrate a call flow diagram for per-bearer switching of bearer traffic between the WWAN 10 and the WLAN 14 according one or more embodiments, in the context described above for LWIP. In FIGS. 11A-B, the eNB 46 constitutes the WWAN base station 18 and the UE 38 constitutes the wireless communication device 12 in FIG. 1. As explained more fully below, the eNB 46 sends a message 28 to the device 12 in the form of an RRC Connection Reconfiguration message in step 3 of FIG. 11A. This RRC Connection Reconfiguration message in step 3 triggers establishment of a secure tunnel 24 in the form of an IPSec tunnel between the UE 38 and the security gateway SeGW 22A. The RRC Connection Reconfiguration message in this regard indicates that traffic for bearer-2 is to be switched to WLAN, and includes information to establish the IPSec tunnel between UE 38 and SeGW 22A. Indeed, in the embodiment of FIGS. 11A-B, the RRC Connection Reconfiguration message includes address information of the SeGW 22A (in the form of an IP address for SeGW 22A) and includes address information of the eNB 46 (in the form of an IP address for eNB 46). FIGS. 11A-B also show that the RRC Connection Reconfiguration message may optionally include information mapped to security credentials that the UE 38 and the eNB 46 use for communication over LTE. Specifically, the RRC Connection Reconfiguration message may include an identity of an LTE context (UE-context-ID) as shown in Step 3.

Responsive to the RRC Connection Reconfiguration message in Step 3, the UE 38 sends a request to the SeGW 22A for the SeGW 22A to establish the IPSec tunnel. The UE 38 sends this request in the form of an IKE_SA_INIT message in Step 5a of FIG. 11A. This IKE_SA_INIT message may include address information of the eNB 46 in the form of an eNB-ID, and may include information mapped to the security credentials in the form of the UE-context-ID.

Responsive to this request from the UE 38, the SeGW 22A initiates authentication of the IPSec tunnel establishment towards the eNB 46 using the eNB-ID in the IKE_AUTH message. The SeGW 22A in this regard sends the eNB 46 an authentication request in the form of an EAP (extensible authentication protocol) Response in Step 7 in FIG. 11B. This EAP Response includes the eNB-ID and UE-context-ID.

In Step 8, the eNB 46 identifies the key KeNB as the security credentials which are mapped at the eNB 46 to the UE-context-ID. The eNB 46 then performs authentication of the IPSec tunnel establishment in Step 9 based on the key KeNB, with the SeGW 22A forwarding authentication signaling between the UE 38 and eNB 46. Upon successful authentication, the eNB 46 distributes keying material for securing the IPSec tunnel in Step 10 and 11. With the tunnel established, the eNB 46 and UE 38 may switch traffic on a per bearer basis (e.g., for bearer-2), by distinguishing traffic of different bearers in Step 14.

The steps of FIGS. 11A-B will now be described in more detail.

Step 1: In the initial step of FIG. 11A, the UE 38 has a control plane connection and two different user plane bearers active (normally via LTE-Uu interface to the eNB 46). The control plane connection is shown as step 1a. The user plane bearers, including a default bearer and bearer-2, are shown as step 1b.

Step 2: The eNB 46 decides that the UE 38 should start aggregating traffic over legacy WLAN 52. This decision can only apply for a subset of all the bearers for the UE 38. In the current example, the decision is for the bearer-2.

Step 3: The eNB 46 sends an RRCConnectionReconfiguration message to the UE 38 to indicate that bearer-2 should be offloaded to legacy WLAN 52. The message contains a "list of bearers" containing an indication of bearer-2. The message also contains one or more SeGW identifier(s) (IP address, FQDN), eNB IP address and optionally eNB-ID and UE-context-ID. The eNB-ID and the UE-context-ID can be explicitly signaled or the UE 38 can use other information available for the identifiers. For example, the eNB-ID could be the eND Identity part of the 28 bit Cell Identifier, or the whole 28 bit cell identifier could be used. In a similar way, a C-RNTI allocated for the UE 38 by the eNB 46 could be used as the UE-context-ID. In case SeGW identifier is on FQDN format, the UE 38 performs a DNS query to retrieve the SeGW IP address(es). The SeGW IP address can be called SeGW-Transport IP address and the eNB IP address can be called eNB-Remote IP address. In addition, the message may also contain a mobility set which is a group of WLAN identifiers corresponding to WLAN APs among which the UE 38 may perform UE based WLAN mobility.

The UE-Remote IP address and UE-Remote UDP port can be used to indicate the bearer the uplink data belongs to. In this regard, the eNB 46 may also optionally include an eNB Remote UDP-port for each bearer to be offloaded to legacy WLAN 52. This eNB Remote UDP-port can be used in combination with the eNB-Remote IP address to uniquely identify each bearer in the uplink from the UE 38 to the eNB 46. The minimum requirement is however that the UE 38 is aware of a single eNB Remote UDP-port to be used for the offloaded traffic towards the eNB 46 (such a single eNB Remote UDP-port could be signaled from the eNB 46 to the UE 38 in the RRCConnectionReconfiguration message or it could be known to the UE 38 by other means such as standardization of a well-known UDP port). In the case when a single eNB Remote UDP-port is used, the differentiation between different bearers can be based on the "UE—Remote UDP port" for each bearer (see step 13).

Step 4: The UE 38 performs WLAN association towards the legacy WLAN AP belonging to the mobility set as indicated in step 4. The UE 38 also receives an IP address from the legacy WLAN 52. This AP-address is called UE-Transport IP address.

Step 5: The UE 38 uses the IP address of the SEGW (SeGW-Transport IP address as the destination address and UE-Transport IP address as the source address), and initializes the IKEv2 authentication procedure by starting the IKE_SA_INIT exchange. It indicates the desire to use EAP by leaving out the AUTH payload from message 3 of the IKE_AUTH exchange, and the initiator identity is composed compliant with the Network Access Identifier (NAI) format specified in RFC 2486 [36], and contains the eNB-ID and UE-context-ID (e.g. in the format of "UE-context-ID©eNB-ID"). The UE uses NAI in the format of "UE-context-ID©eNB-ID".

Step 6: The SeGW 22A selects the correct eNB 46 based on the realm part of the NAI (i.e. the "eNB-ID" part).

Step 7: The SeGW 22A sends an EAP Response/Identity message to the eNB 46 (in its role as an AAA server), containing the identity included in the third IKE message (i.e. "UE-context-ID©eNB-ID"). That is, the SeGW 22A includes the "UE-context-ID©eNB-ID" in the EAP Response/Identity message. This triggers the start of any EAP authentication. The EAP Response/Identity message can be carried using e.g. RADIUS or DIAMETER signaling between the SeGW 22A and the eNB 46.

Step 8: The eNB 46 uses the received "UE-context-ID" to locate the UE context that includes for example the KeNB and other important information.

Step 9: The eNB 46 authenticates the UE 38 using any EAP-authentication mechanism using KeNB as the main key. This step may contain multiple steps between the eNB 46 and the UE 38, transported for example using RADIUS or DIAMETER between the eNB 46 and the SeGW 22A, and using IKEv2 between the SeGW 22A and the UE 38.

Step 10: If the authentication in step 9 is successful, then the eNB 46 sends the EAP Success message to the SeGW 22A. The eNB 46 includes derived keying material for confidentiality and/or integrity protection between UE 38 and SEGW 22A, in the underlying AAA protocol message (i.e. not at EAP level).

Step 11: The SeGW 22A informs the UE 38 about the successful authentication with the EAP Success message.

Step 12: As the EAP exchange has been successfully completed, the IKE signaling can be completed. A Secure Association between UE 38 and SeGW 22A has been completed. The UE 38 also receives an IP address in the network behind the SeGW 22A (this IP may be called UE-Remote IP address (and is the IP address that will be seen by the eNB 46).

Step 13: The UE 38 returns a RRCConnectionReconfigurationComplete message to the eNB 46. This message may also contain the UE-Remote IP address and a UE-Remote UDP port for each bearer indicated in the RRCConnectionReconfiguration message. The sole purpose of providing these information elements to the eNB 46 is to allow the eNB 46 to send downlink data towards the UE 38 so that the UE 38 gets an indication of which bearer the downlink data belongs to. In a similar way, the UE 38 can use the UE-Remote IP address and UE-Remote UDP port to indicate the bearer the uplink data belongs to. The eNB 46 can then use this information to forward the uplink data on the correct GTP-U tunnel towards the SGW.

When the eNB 46 receives the RRCConnectionReconfigurationComplete message it stores the received UE-Remote IP address and a UE-Remote UDP port for each bearer and uses these when transmitting and receiving data related to a specific bearer as described above.

Figure 12:
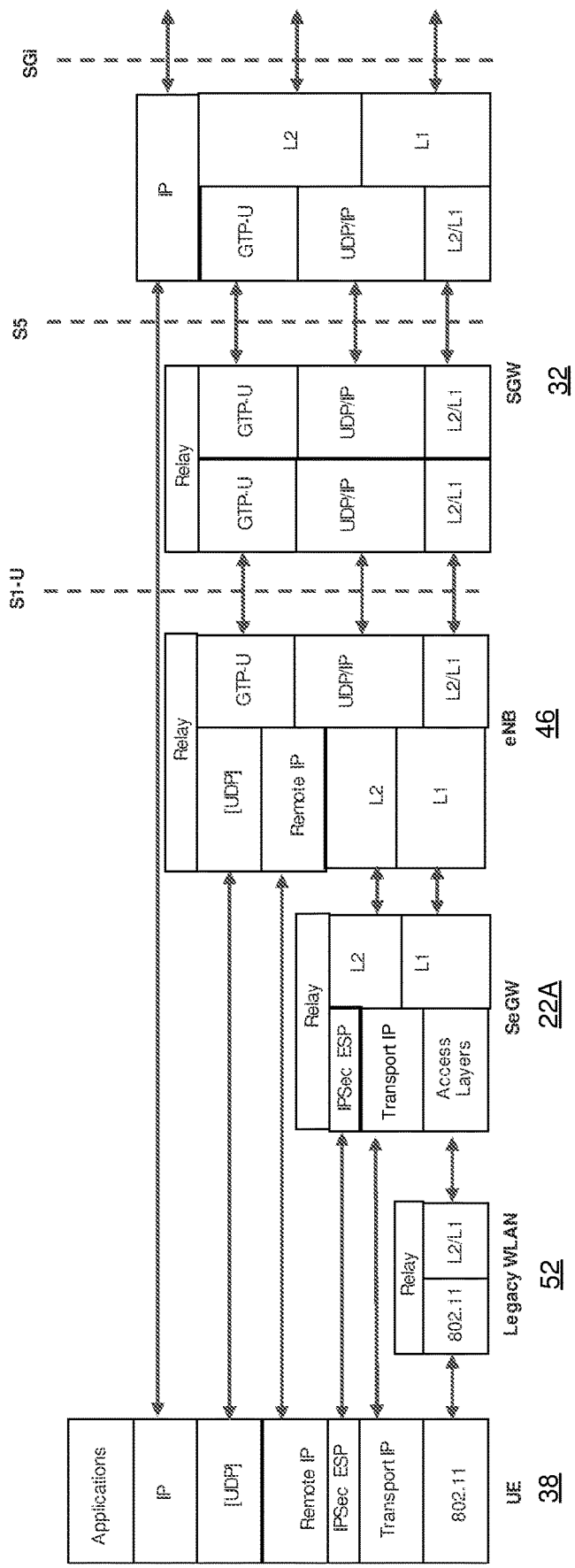
FIG. 12 is a block diagram of a user plane protocol stack for legacy WLAN according to some embodiments.

Step 14: the situation after the actions of the current signaling flow the UE 38 still has the control plane connection and the default bearer as normally via the LTE-Uu interface towards the eNB (as shown by steps 14a and 14b)). The bearer-2 has been moved to legacy WLAN 52 and is associated with the IPsec tunnel between the UE 38 and the SeGW 22A (via the legacy WLAN AP). The outer IP addresses for this IPsec tunnel are the UE-Transport IP address and the SeGW-Transport IP address. The inner IP addresses for the IPsec tunnel are UE-Remote IP address (source address in the uplink packets and destination address in the downlink packets) and the eNB-Remote IP Address (in a similar way source address in the downlink packets and destination address in the uplink packets). In addition, an eNB Remote UDP-port for each bearer or a UE-Remote UDP port for each bearer can be used to differentiate the different offloaded bearers. It is also possible to use the combination of both eNB Remote UDP-port and UE-Remote UDP port for each bearer. Both options are usable in uplink and downlink. See FIG. 12 for one example of the user plane protocol stack for the legacy WLAN bearer.

The above steps are mainly to illustrate an example of certain embodiments herein. For example, in the above steps a single RRCConnectionReconfiguration/RRCConnectionReconfigurationComplete sequence is used both for control of the IPsec tunnel establishment and for the triggering of the bearer offload to legacy WLAN 52. In another case, these two actions could be separated to different RRCConnectionReconfiguration/RRCConnectionReconfigurationComplete sequences.

In addition, the above signaling flow is merely to be seen as an example of certain embodiments. For example, the UE-Remote UDP port for each bearer is one way to achieve the bearer specific indications between the UE 38 and the eNB 46 (via the legacy WLAN 52), and it can be used in both uplink and downlink. In a similar way, the eNB-Remote UDP port for each bearer could be used to identify different bearers between the UE 38 and the eNB 46 (via the legacy WLAN 52). Finally, it is also possible to use the combination of both eNB Remote UDP-port and UE-Remote UDP port for each bearer. Other examples could be usage of TCP connections and TCP ports for each bearer. In still another variant a single connection is used between the UE 38 and the eNB 46 and on this connection a protocol is introduced and the protocol header for this new protocol have the capability to include a bearer identity (to indicate the bearer to which transmitted data is associated with).

In some embodiments, the proposed signaling scheme enables the usage of a standalone IPsec SeGW in the case of transparent aggregation between legacy WLAN and LTE. This enables additional deployment options for the cellular operators. Further, the eNB 46 does not have the processing burden for establishing/maintaining/releasing IPSec tunnels. In addition, the eNB 46 does not need to be physically accessible from e.g. the Internet as the IPsec SeGW (and likely also included firewall functionality) protects the network in which the eNB 46 is located in.

In existing deployments, data is not routed via the eNB 46 to the UE 38, but rather directly from the P-GW 30 to the ePDG 42. Thus, one or more embodiments include a new interface between eNB 46 and SeGW(ePDG) 22A(42) to provide the functionality of per-bearer switching between LTE and WLAN in the eNB 46 and IPSec tunnel establishment from ePDG 42 to the UE 38.

In view of the various modifications and variations above, those skilled in the art will appreciate that the security gateway 22, WWAN base station 18, and wireless communication device 12 may each be configured to perform as described above by implementing any functional means or units. In one embodiment, for example, one or more of these nodes comprise respective circuits configured to perform their respective processing steps shown in the above figures. The circuits in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more for carrying out one or more microprocessors, carries out the techniques described herein.

Figure 13:
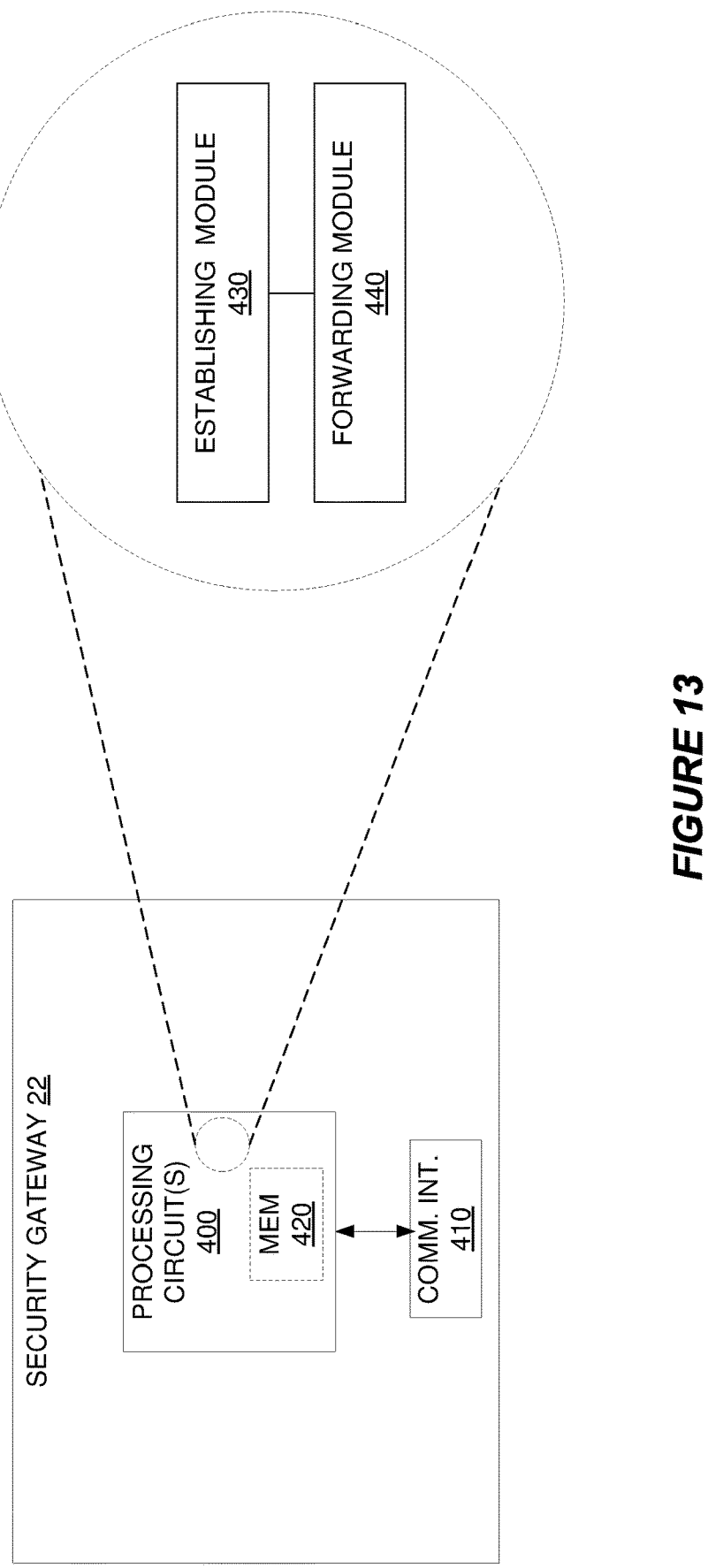
FIG. 13 is a block diagram of a security gateway according to some embodiments.
Figure 14:
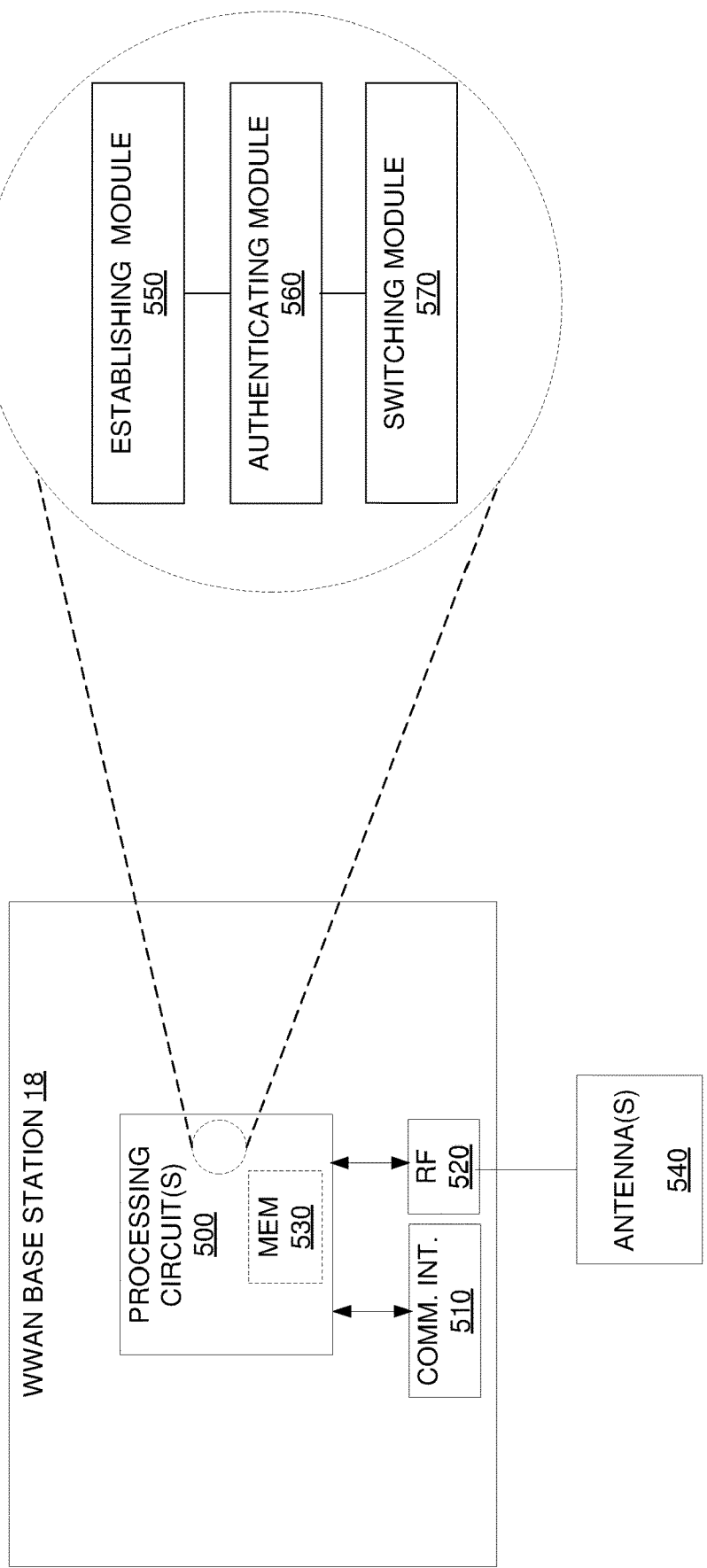
FIG. 14 is a block diagram of a WWAN base station according to some embodiments.
Figure 15:
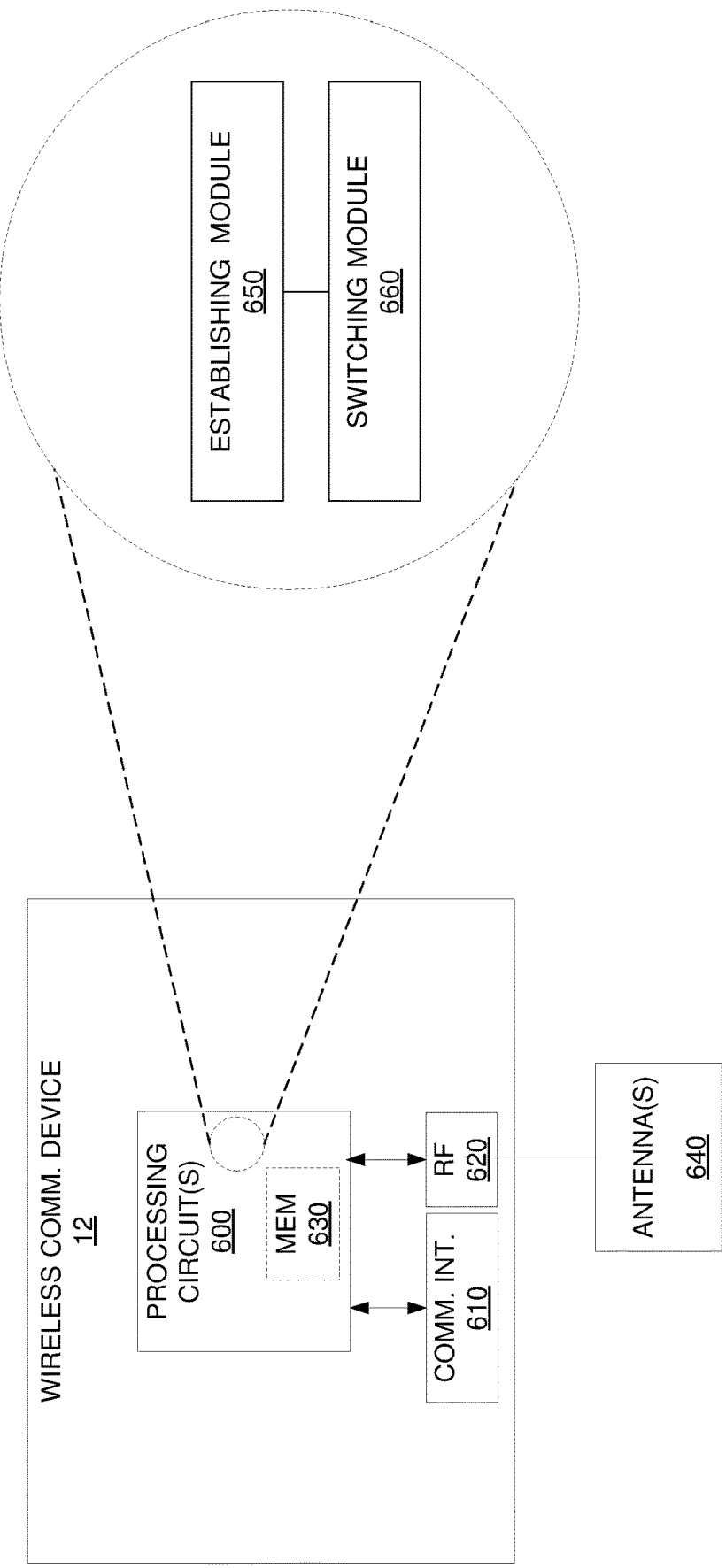
FIG. 15 is a block diagram of a wireless communication device according to some embodiments.

FIGS. 13-15 illustrates exemplary nodes according to some embodiments herein. FIG. 13 for instance illustrates additional details of a security gateway 22 in accordance with one or more embodiments. As shown, the security gateway 22 includes one or more processing circuits 400 and one or more communication interfaces 410. The communication interface(s) are 410 configured to communicate with the WWAN base station 18 and/or the wireless device 12, e.g., via one or more interfaces to or from a radio access network. The processing circuit(s) 400 are configured to perform processing described above, e.g., in the figures, such as by executing instructions stored in memory 430.

FIG. 13 also shows that the security gateway 22 in some embodiments implements various functional means or units, e.g., via the processing circuit(s) 400. These functional means or units may include different means or units for performing different respective steps in the above figures. As shown, for instance, the security gateway 22 includes an establishing module 430 for establishing a secure tunnel 24 through the WLAN 14 to a wireless communication device 12 served over the WWAN 10 by a WWAN base station 18, based on the WWAN base station 18 sending a message to the wireless communication device 12 to establish the secure tunnel 14. Also included is a forwarding module 440 for forwarding bearer traffic between the wireless communication device 12 and the WWAN base station 18 on a per bearer basis, via the secure tunnel 24 and a connection between the security gateway 22 and the WWAN base station 18.

FIG. 14 illustrates additional details of a WWAN base station 18 in accordance with one or more embodiments. As shown, the WWAN base station 18 includes one or more processing circuits 500, one or more communication interfaces 510, and/or one or more radio frequency interfaces 520. By way of the communication interface(s) 510 and radio frequency interface(s) 520, the WWAN base station 18 is configured to communicate with the security gateway 22 and/or the wireless device 12. The processing circuit(s) 500 are configured to perform processing described above, e.g., in the figures, such as by executing instructions stored in memory 530.

FIG. 14 also shows that the WWAN base station 18 in some embodiments implements various functional means or units, e.g., via the processing circuit(s) 500. These functional means or units may include different means or units for performing different respective steps in the above figures. As shown, for instance, the WWAN base station 18 includes an establishing module 550 for sending a message, to a wireless communication device 12 served over the WWAN 10 by the base station 18, to establish a secure tunnel 24 through the WLAN 14 between a security gateway 22 and the wireless communication device 12. Further included is a switching module 570 for switching bearer traffic for the wireless communication device 12 between the WWAN 10 and the WLAN 14 on a per bearer basis, with bearer traffic switched to the WLAN 14 being transported over a connection 26 with the security gateway 22 and through the secure tunnel 24. In some embodiments, the WWAN base station 18 may also include an authenticating module 560 for authenticating establishment of the secure tunnel 24.

FIG. 15 illustrates additional details of a wireless communication device 12 in accordance with one or more embodiments. As shown, the wireless communication device 12 includes one or more processing circuits 600, one or more communication interfaces 610, and/or one or more radio frequency interfaces 620. By way of the communication interface(s) 610 and radio frequency interface(s) 620, the wireless communication device 12 is configured to communicate with the security gateway 22 and/or the WWAN base station 18. The processing circuit(s) 600 are configured to perform processing described above, e.g., in the figures, such as by executing instructions stored in memory 630.

FIG. 15 also shows that the wireless communication device 12 in some embodiments implements various functional means or units, e.g., via the processing circuit(s) 600. These functional means or units may include different means or units for performing different respective steps in the above figures. As shown, for instance, the wireless communication device 12 includes an establishing module 600 for establishing a secure tunnel 24 through the WLAN 14 to a security gateway 22, based on the wireless communication device 12 receiving a message from the WWAN base station 18 to establish the secure tunnel 24. Also included is a switching module 610 for switching bearer traffic for the wireless communication device 12 between the WWAN 10 and the WLAN 14 on a per bearer basis, with bearer traffic switched to the WLAN 14 being transported through the secure tunnel 24 and over a connection 26 between the security gateway 22 and the WWAN base station 18.

Those skilled in the art will also appreciate that embodiments herein further include corresponding computer programs.

A computer program comprises instructions which, when executed on at least one processor of a node, cause the node to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

Those skilled in the art will recognize that the present invention may be carried out in other ways than those specifically set forth herein without departing from essential characteristics of the invention. The present embodiments are thus to be considered in all respects as illustrative and not restrictive, and all changes coming within the meaning and equivalency range of the appended claims are intended to be embraced therein.

What is claimed is:

1. A method implemented by a security gateway for supporting per-bearer switching of bearer traffic between a wireless wide area network (WWAN) and a wireless local area network (WLAN) in a manner transparent to the WLAN, the method comprising:
   establishing, by the security gateway, a secure tunnel through the WLAN to a wireless communication device served over the WWAN by a WWAN base station, directly based on the WWAN base station sending a message to the wireless communication device to establish the secure tunnel; and
   forwarding bearer traffic between the wireless communication device and the WWAN base station on a per bearer basis, via the secure tunnel and a connection between the security gateway and the WWAN base station.

2. The method of claim 1, wherein said establishing comprises establishing the secure tunnel based on the WWAN base station authenticating the establishment of the secure tunnel.

3. The method of claim 1, further comprising:
   receiving, from the wireless communication device, address information of the WWAN base station and information mapped to security credentials that the wireless communication device and the WWAN base station use for communication over the WWAN;
   receiving, from the wireless communication device, a request for the security gateway to establish the secure tunnel;
   responsive to said request, initiating authentication of the secure tunnel establishment towards the WWAN base station using the address information, by sending to the WWAN base station an authentication request that includes said information; and
   forwarding authentication signaling between the WWAN base station and the wireless communication device as part of the WWAN base station authenticating the secure tunnel establishment based on said security credentials.

4. The method of claim 3, wherein said information comprises address information of the wireless communication device and/or an identity of a WWAN context that is maintained at the WWAN base station for the wireless communication device and that includes said security credentials.

5. A method implemented by a base station of a wireless wide area network (WWAN) for per-bearer switching of bearer traffic between the WWAN and a wireless local area network (WLAN) in a manner transparent to the WLAN, the method comprising:
sending a message, to a wireless communication device served over the WWAN by the WWAN base station, to establish a secure tunnel through the WLAN between a security gateway and the wireless communication device; and
switching bearer traffic for the wireless communication device between the WWAN and the WLAN on a per bearer basis, with the bearer traffic switched to the WLAN being transported over a connection with the security gateway and through the secure tunnel.

6. The method of claim 5, further comprising authenticating the establishment of the secure tunnel.

7. The method of claim 5, further comprising:
receiving from the security gateway an authenticating request that includes information mapped to security credentials that the wireless communication device and the WWAN base station use for communication over the WWAN;
identifying the security credentials mapped at the WWAN base station to said information; and
authenticating the establishment of the secure tunnel based on the security credentials.

8. A method implemented by a wireless communication device served by a base station of a wireless wide area network (WWAN) for per-bearer switching of bearer traffic between the WWAN and a wireless local area network (WLAN) in a manner transparent to the WLAN, the method comprising:
establishing, by the wireless communication device, a secure tunnel through the WLAN to a security gateway, directly based on the wireless communication device receiving a message from the WWAN base station to establish the secure tunnel; and
switching bearer traffic for the wireless communication device between the WWAN and the WLAN on a per bearer basis, with the bearer traffic switched to the WLAN being transported through the secure tunnel and over a connection between the security gateway and the WWAN base station.

9. The method of claim 8, wherein said establishing comprises establishing the secure tunnel based on the WWAN base station authenticating the establishment of the secure tunnel.

10. The method of claim 8, further comprising:
sending, from the wireless communication device to the security gateway, address information of the WWAN base station and information mapped to security credentials that the wireless communication device and the WWAN base station use for communication over the WWAN;
sending, from the wireless communication device to the security gateway, a request for the security gateway to establish the secure tunnel; and
exchanging authentication signaling between the wireless communication device and the WWAN base station as part of the WWAN base station authenticating the secure tunnel establishment based on said security credentials.

11. A security gateway for supporting per-bearer switching of bearer traffic between a wireless wide area network (WWAN) and a wireless local area network (WLAN) in a manner transparent to the WLAN, the security gateway comprising:
processing circuitry and memory, the memory containing instructions executable by the processing circuitry whereby the security gateway is configured to:
establish a secure tunnel through the WLAN to a wireless communication device served over the WWAN by a WWAN base station, directly based on the WWAN base station sending a message to the wireless communication device to establish the secure tunnel; and
forward bearer traffic between the wireless communication device and the WWAN base station on a per bearer basis, via the secure tunnel and a connection between the security gateway and the WWAN base station.

12. The security gateway of claim 11, wherein the security gateway is configured to establish the secure tunnel based on the WWAN base station authenticating the establishment of the secure tunnel.

13. The security gateway of claim 11, wherein the security gateway is further configured to:
receive, from the wireless communication device, address information of the WWAN base station and information mapped to security credentials that the wireless communication device and the WWAN base station use for communication over the WWAN;
receive, from the wireless communication device, a request for the security gateway to establish the secure tunnel;
responsive to said request, initiate authentication of the secure tunnel establishment towards the WWAN base station using the address information, by sending to the WWAN base station an authentication request that includes said information; and
forward authentication signaling between the WWAN base station and the wireless communication device as part of the WWAN base station authenticating the secure tunnel establishment based on said security credentials.

14. The security gateway of claim 13, wherein said information comprises address information of the wireless communication device and/or an identity of a WWAN context that is maintained at the WWAN base station for the wireless communication device and that includes said security credentials.

15. A base station of a wireless wide area network (WWAN) for per-bearer switching of bearer traffic between the WWAN and a wireless local area network (WLAN) in a manner transparent to the WLAN, the base station comprising:
processing circuitry and memory, the memory containing instructions executable by the processing circuitry whereby the base station is configured to:
send a message, to a wireless communication device served over the WWAN by the base station, to establish a secure tunnel through the WLAN between a security gateway and the wireless communication device; and
switch bearer traffic for the wireless communication device between the WWAN and the WLAN on a per bearer basis, with the bearer traffic switched to the WLAN being transported over a connection with the security gateway and through the secure tunnel.

16. The base station of claim 15, further configured to authenticate the establishment of the secure tunnel.

17. The base station of claim 15, further configured to:
receive from the security gateway an authenticating request that includes information mapped to security credentials that the wireless communication device and the base station use for communication over the WWAN;
identify the security credentials mapped at the base station to said information; and
authenticate the establishment of the secure tunnel based on the security credentials.

18. A wireless communication device served by a base station of a wireless wide area network (WWAN) for per-bearer switching of bearer traffic between the WWAN and a wireless local area network (WLAN) in a manner transparent to the WLAN, the wireless communication device comprising:
processing circuitry and memory, the memory containing instructions executable by the processing circuitry whereby the wireless communication device is configured to:
establish a secure tunnel through the WLAN to a security gateway, directly based on the wireless communication device receiving a message from the WWAN base station to establish the secure tunnel; and
switch bearer traffic for the wireless communication device between the WWAN and the WLAN on a per bearer basis, with the bearer traffic switched to the WLAN being transported through the secure tunnel and over a connection between the security gateway and the WWAN base station.

19. The wireless communication device of claim 18, configured to establish the secure tunnel based on the WWAN base station authenticating the establishment of the secure tunnel.

20. The wireless communication device of claim 18, further configured to:
send, from the wireless communication device to the security gateway, address information of the WWAN base station and information mapped to security credentials that the wireless communication device and the WWAN base station use for communication over the WWAN;
send, from the wireless communication device to the security gateway, a request for the security gateway to establish the secure tunnel; and
exchange authentication signaling between the wireless communication device and the WWAN base station as part of the WWAN base station authenticating the secure tunnel establishment based on said security credentials.

\* \* \* \* \*